United States Patent
Zhao et al.

(10) Patent No.: US 11,792,106 B2
(45) Date of Patent: Oct. 17, 2023

(54) METHOD, NODE, AND SYSTEM FOR TRAFFIC TRANSMISSION

(71) Applicant: HUAWEI TECHNOLOGIES CO., LTD., Guangdong (CN)

(72) Inventors: Yan Zhao, Beijing (CN); Yibo Yang, Chengdu (CN); Renjie Qu, Chengdu (CN); Nan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/856,790

(22) Filed: Jul. 1, 2022

(65) Prior Publication Data
US 2022/0337505 A1  Oct. 20, 2022

Related U.S. Application Data

(63) Continuation of application No. PCT/CN2020/117289, filed on Sep. 24, 2020.

(30) Foreign Application Priority Data

Jan. 6, 2020  (CN) .......................... 202010010640.6
Apr. 13, 2020  (CN) .......................... 202010287505.6

(51) Int. Cl.
*G06F 15/173* (2006.01)
*H04L 45/02* (2022.01)
*H04L 45/00* (2022.01)

(52) U.S. Cl.
CPC .............. *H04L 45/02* (2013.01); *H04L 45/20* (2013.01); *H04L 45/566* (2013.01)

(58) Field of Classification Search
CPC ........ H04L 45/02; H04L 45/20; H04L 45/566
(Continued)

(56) References Cited

U.S. PATENT DOCUMENTS 7,212,490 B1 * 5/2007 Kao .................... H04L 43/0852
                                                            370/406
7,945,658 B1 * 5/2011 Nucci .................... H04L 41/12
                                                            709/239
(Continued)

FOREIGN PATENT DOCUMENTS

CN         1567891 A      1/2005
CN         1719805 A      1/2006
(Continued)

OTHER PUBLICATIONS

Davik F et al: "IEEE 802.17 resilient packet ring tutorial", IEEE Communications Magazine, IEEE Service Center, Piscataway, US, col. 42, No. 3, Mar. 1, 2004 (Mar. 1, 2004) pp. 112-118, XP011108920 ISSN:0163-6804, DOI:10.1109/MCOM.2004.1273782.

*Primary Examiner* — Anthony Mejia
(74) *Attorney, Agent, or Firm* — HUAWEI TECHNOLOGIES CO., LTD.

(57) ABSTRACT

A method is applied to a ring link, where the ring link includes a first node, a second node, a third node, and a fourth node in sequence. According to the method, the first node receives first traffic, where the first node is a source node that sends the first traffic on the ring link; and the first node sends the first traffic to the third node, where two reachable paths with equal hop counts are included from the first node to the third node, the first node sends the first traffic to the third node on a preset first transmission path, the first transmission path passes through the second node, and the first transmission path is one of the two reachable paths with equal hop counts. This method can reduce computing load of nodes while implementing non-blocking switching of traffic between the nodes.

15 Claims, 14 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2006/0092856 | A1* | 5/2006 | Mitsumori | ............ H04L 12/437 |
| | | | | 370/254 |
| 2011/0113154 | A1* | 5/2011 | Maruyama | ............ H04L 12/437 |
| | | | | 709/251 |
| 2014/0016470 | A1 | 1/2014 | Li | |
| 2016/0365941 | A1* | 12/2016 | Beranek | ............... H04B 10/278 |
| 2018/0107599 | A1* | 4/2018 | Chuang | ............... G06F 12/0813 |
| 2018/0331955 | A1 | 11/2018 | Ju et al. | |
| 2019/0372885 | A1* | 12/2019 | Warnock | ................. H04L 45/20 |
| 2022/0337505 | A1* | 10/2022 | Zhao | ..................... H04L 47/125 |

FOREIGN PATENT DOCUMENTS

| | | | | |
|---|---|---|---|---|
| CN | 107547365 A | | 1/2018 | |
| CN | 108632143 A | | 10/2018 | |
| EP | 2079195 A1 * | | 7/2009 | ........... H04L 12/437 |
| WO | WO-2013048391 A1 * | | 4/2013 | ......... H04L 12/1881 |
| WO | WO-2017146718 A1 * | | 8/2017 | ........... H04L 12/423 |

* cited by examiner

METHOD, NODE, AND SYSTEM FOR TRAFFIC TRANSMISSION

CROSS-REFERENCE TO RELATED APPLICATIONS

This application is a continuation of International Application No PCT/CN2020/117289, filed on Sep. 24, 2020, which claims priority to Chinese Patent Application No. 202010010640.6, filed on Jan. 6, 2020 and Chinese Patent Application No. 202010287505.6, filed on Apr. 13, 2020. All of the aforementioned patent applications are hereby incorporated by reference in their entireties.

TECHNICAL FIELD

This application relates to the field of communication technologies, and in particular, to a method, node, and system for traffic transmission.

BACKGROUND

A requirement of an early network for a bandwidth of a single network switching device is low, and generally, one switching device includes only one switching chip. As shown in FIG. 1, only one node is packaged in a chip. The node refers to a basic dicing unit in an entire silicon chip or wafer in a semiconductor process, for example, a die. With development of technologies, a single-device single-chip single-node design gradually cannot meet a rapidly increasing requirement of a network for a fabric bandwidth of a switching device. Therefore, a plurality of designs for improving a switching capability of a device emerge. For example, a plurality of switching devices form a small ring network system, each switching device includes one or two switching chips, and each switching chip includes one or two nodes, to form a multi-node structure. A shortest path first algorithm may be used to implement load balancing during traffic transmission in a multi-node ring network structure. According to the algorithm, when traffic is sent from a source node to a destination node, if there are two forwarding paths with a same hop count, the source node may send 50% of the traffic on each of the two forwarding paths, to implement load balancing during traffic transmission. However, when the traffic is sent to the destination node on the two forwarding paths, packets or packet slices included in the two parts of traffic transmitted along different forwarding paths may need to be reordered at the destination node, to ensure normal use of the traffic. A reordering operation performed by the destination node on the traffic consumes a large quantity of computing resources, increasing an area, power consumption, and a delay of a chip.

SUMMARY

This application provides a method, node, and system for traffic transmission. According to the method for traffic transmission provided in this application, a destination node that receives traffic on a ring link does not need to reorder packets of the traffic, reducing consumption of node resources.

According to a first aspect, this application provides a system for traffic transmission, where the system includes a first node, a second node, a third node, and a fourth node, and the first node, the second node, the third node, and the fourth node are four nodes arranged in sequence on a ring link. The first node is configured to forward, through the second node according to a forwarding policy of the first node, all of first traffic that needs to be sent to the third node, where two reachable paths with equal hop counts are included from the first node to the third node. The second node is configured to forward, through the first node according to a forwarding policy of the second node, all of second traffic that needs to be sent to the fourth node, where two reachable paths with equal hop counts are included from the second node to the fourth node.

In a case, when the first node, the second node, the third node, and the fourth node are network devices, the system is a network system including the foregoing four network devices.

In another case, if the first node, the second node, the third node, and the fourth node are all basic dicing units in a chip, that is, the first node, the second node, the third node, and the fourth node are packaged in one or more chips in the system, and if the foregoing four nodes belong to one or more chips in a same network device, the system is a device internal system that includes a ring link including the four nodes in the network device. If the foregoing four nodes belong to a plurality of chips in a plurality of network devices, the system is a network system that includes the plurality of network devices including the four nodes. Each node on the ring link includes one group of line ports, configured to connect to a line port of a network device to which the node belongs. Each node further includes two groups of fabric ports, configured to connect to other two nodes directly connected in the ring network structure separately.

In the ring link, two reachable paths with equal hop counts are included from the first node to the third node, that is, the third node is a node, a hop count from which to the first node is the largest based on a shortest path first algorithm, among all nodes on the ring link.

One transmission path in the two reachable paths with equal hop counts that are included from the first node to the third node is specified, to be used by the first node to send all of the first traffic. Therefore, the first node may be considered as a source node that sends the first traffic on the ring link, that is, the $1^{st}$ node through which the first traffic passes on the ring link. This manner of sending traffic on a specified path can implement non-blocking switching of traffic between nodes. In addition, after receiving a plurality of packets or packet slices included in the first traffic, the third node serving as a destination node on the ring link does not need to reorder the plurality of packets or packet slices, reducing a requirement for node resources. Further, when the nodes are basic dicing units integrated into a chip of a network device, an area, power consumption, and a delay of the entire chip can be reduced.

In addition, in the two reachable paths with equal hop counts that are from the second node to the fourth node, a path that passes through the first node instead of a path that passes through the third node is specified as a transmission path of the second traffic. This can avoid that the first traffic and the second traffic both occupy a link from the second node to the third node when being sent in a same period of time, reducing a possible problem such as a network conflict or network congestion, and improving traffic sending efficiency and transmission quality on the ring link.

In a possible implementation, the third node is configured to forward, through the fourth node according to a forwarding policy of the third node, all of third traffic that needs to be sent to the first node. The fourth node is configured to forward, through the third node according to a forwarding policy of the fourth node, all of fourth traffic that needs to be sent to the second node. In this way, the system can ensure that, in the four nodes, traffic sent by any node to a peer node that has two reachable paths with equal hop counts to the node (referred to as a peer node) and traffic sent by another node to a peer node of the another node occupy different transmission paths in a same period of time, thereby improving traffic sending efficiency and transmission quality on the ring link.

In a possible implementation, the forwarding policy of the first node includes presetting that the first node needs to send traffic to the third node through the second node, and the forwarding policy of the second node includes presetting that the second node needs to send traffic to the fourth node through the first node. In this case, both the forwarding policies of the first node and the second node are statically configured forwarding policies, that is, all traffic sent from the first node to the third node passes through the second node, and all traffic sent from the second node to the fourth node passes through the first node. It can be learned that, a binding relationship exists between the first node and the second node, and the binding relationship may be reflected by transmission paths separately preset when the first node and the second node send traffic to peer nodes. Specifically, the first node needs to send traffic to the peer node of the first node through the second node, and the second node needs to send traffic to the peer node of the second node through the first node. The foregoing forwarding policy configuration manner can improve stability and reliability of traffic transmission.

In a possible implementation, 4N or 4N+2 nodes are included on the ring link, where the first node, the second node, the third node, and the fourth node are arranged in sequence in the 4N or 4N+2 nodes, N≥1, and N is an integer. When only the first node, the second node, the third node, and the fourth node are included on the ring link, the four nodes are arranged on the ring link clockwise or counterclockwise. When 8N or 4N+2 nodes are included on the ring link, in addition to the first node, the second node, the third node, and the fourth node, an even quantity of other nodes may further be included on the ring link. In this case, some or all of the first node, the second node, the third node, and the fourth node are no longer arranged next to each other in sequence, but the first node, the second node, the third node, and the fourth node are still arranged in sequence clockwise or counterclockwise on the ring link. One or more other nodes may be included between any two of the foregoing four nodes.

In a possible implementation, when 8N or 4N+2 nodes are included on the ring link, the first node sends the first traffic to the second node through a plurality of nodes including the second node.

In a possible implementation, the first traffic includes a packet, and the first node is configured to encapsulate indication information indicating the second node and the third node into the packet, and send the packet to the third node. A node that receives a corresponding packet can determine, based on the indication information, a next hop for transmitting the packet or that the node is a destination node of the packet. When the node determines, based on the indication information, that the packet further needs to be forwarded to the next hop, the node may update the indication information (where for example, when the indication information is a label stack, a stack top label may pop up, and an updated stack top label becomes a label of the next-hop node), and may continue to forward the packet.

When the node is specifically a basic dicing unit integrated in a chip, the node may update the indication information, and may forward the packet through a fabric port of the node. When the node determines, based on the indication information, that the node itself is the destination node of the packet, the node may send, through a line port of the node, the packet to a line port of a network device to which the node belongs, so that the network device processes the packet.

According to a second aspect, this application provides a method for traffic transmission. The method is applied to a ring link, and the ring link includes a first node, a second node, a third node, and a fourth node in sequence. The method includes: The first node receives first traffic, where the first node is a source node that sends the first traffic on the ring link; and the first node sends the first traffic to the third node, where two reachable paths with equal hop counts are included from the first node to the third node, the first node sends the first traffic to the third node on a preset first transmission path, the first transmission path passes through the second node, and the first transmission path is one of the two reachable paths with equal hop counts.

The source node is the $1^{st}$ node through which the traffic passes on the ring link. In a case, the first node, the second node, the third node, and the fourth node may be network devices. In this case, that the first node receives the first traffic may be that the first node receives the first traffic from another network device or user equipment. In another case, the first node, the second node, the third node, and the fourth node may be basic dicing units integrated in a network device. The nodes on the ring link may be evenly or unevenly distributed in a plurality of network devices, or all of the nodes may be included in one network device. The nodes each may be specifically packaged in a chip of a corresponding network device. That the first node receives the first traffic may be that the first node receives the first traffic through a line port.

One transmission path in the two reachable paths with equal hop counts that are included from the first node to the third node is specified, to be used by the first node to send all of the first traffic. This manner of sending traffic on a specified path can implement non-blocking switching of traffic between nodes. In addition, after receiving a plurality of packets or packet slices included in the first traffic, the third node serving as a destination node does not need to reorder the plurality of packets or packet slices, reducing a requirement for node resources. Further, when the nodes are basic dicing units integrated into a chip of a network device, an area, power consumption, and a delay of the entire chip can be reduced. The destination node is the last node through which the traffic passes on the ring link.

In a possible implementation, the first node receives second traffic on a second transmission path, where the second transmission path of the second traffic includes the third node and the fourth node, and the third node is a source node of the second traffic on the ring link. When the first node receives the second traffic of the third node serving as a source node, the second traffic flows into the first node serving as a destination node through the fourth node different from the second node, that is, the first transmission path used when the first node sends traffic to the third node is different from the second transmission path used when the third node sends traffic to the first node. The first transmission path and the second transmission path may constitute the complete ring link. In this way, resources of each node can be saved on a basis of ensuring non-blocking switching of a plurality of pieces of traffic on the ring link.

In a possible implementation, a binding relationship exists between the first node and the second node, the first transmission path is determined according to a forwarding policy of the first node, and the forwarding policy includes specifying, based on the binding relationship, that the first node needs to send traffic to the third node through the second node. The binding relationship may be explicit. For example, the binding relationship is preset and stored on the first node, to be used as a constraint to be followed when a transmission path is determined. Alternatively, the binding relationship may be non-explicit, but is used as a principle that needs to be followed when a transmission path is preset on the first node, or used as a rule that needs to be followed when the forwarding policy of the first node is formulated. For reflecting that the first node follows the foregoing principle, in a traffic sending path table stored by the first node, a specified path for sending traffic by the first node to the third node includes the second node. It can be learned that the binding relationship is not necessarily explicit, provided that such an association relationship between nodes can be reflected in a finally specified forwarding path between the nodes.

By configuring or complying with the foregoing binding relationship, or an association relationship that is between nodes and that is reflected by using a preset forwarding path, the first node can forward traffic to the third node through a node that has the binding relationship (association relationship) with the first node. Actually, the third node may also have the foregoing binding relationship with the fourth node, so that the third node sends traffic to the first node through the fourth node. By configuring or complying with a binding relationship between nodes on the ring link, a transmission path used when the first node sends traffic to the third node and a transmission path used when the fourth node sends traffic to the second node do not overlap. Even if the foregoing two pieces of traffic are sent by the first node and the fourth node respectively in a same period of time, problems such as a network conflict or network congestion caused by occupying a link between the first node and the second node at the same time can be alleviated, thereby improving traffic sending efficiency and transmission quality on the ring link.

In a possible implementation, 4N or 4N+2 nodes are included on the ring link, where the first node, the second node, the third node, and the fourth node are arranged in sequence in the 4N or 4N+2 nodes, N≥1, and N is an integer.

In a possible implementation, when 8N or 4N+2 nodes are included on the ring link, the first transmission path passes through a plurality of nodes including the second node.

In a possible implementation, the first traffic includes a packet, and that the first node sends the first traffic to the third node on a preset first transmission path includes: The first node encapsulates indication information used to indicate the first transmission path into the packet, and sends the packet to the third node.

In a possible implementation, the first node, the second node, and the third node are packaged in one or more chips.

According to a third aspect, this application provides a first node for traffic transmission. The first node belongs to a ring link, the ring link further includes a second node, a third node, and a fourth node, the four nodes are arranged in sequence, and two reachable paths with equal hop counts are included between the first node and the third node. The first node includes: a first transceiver, configured to receive first traffic, where the first node is a source node that sends the first traffic on the ring link; and a second transceiver, configured to send the first traffic to the third node on a preset first transmission path, where the first transmission path passes through the second node, and the first transmission path is one of the two reachable paths with equal hop counts.

In a possible implementation, the first node is a network device, for example, a network device that has a packet forwarding function, such as a router or a switch.

In another possible implementation, the first node is a basic dicing unit integrated into a chip (for example, a switching chip) of a network device, and one or more of the second node, the third node, and the fourth node may also belong to the network device. When the first node and one or more other nodes on the ring link are located in a same network device, the first node and the one or more other nodes may be located on a same switching chip or may be located on different switching chips. The network device may alternatively be a switching board in a device. The switching board includes, for example, a switching chip, and the first node may be located on the switching chip.

The first transceiver and the second transceiver each may include one or more units having a receiving function and a sending function. The first transceiver is used as an example. The first transceiver may include one or more units that have both a receiving function and a sending function, for example, a port, a circuit, or a component. Alternatively, when the first transceiver includes a plurality of units that have a receiving or sending function, for example, some of the plurality of units may have a receiving function and the other may have a sending function, or some may have a receiving function and a sending function and the other may have a receiving function or a sending function. When the first node is a basic dicing unit in a chip of a network device, the first transceiver may be one or more line ports, and the second transceiver may be one or more fabric ports.

For a ring link structure and related descriptions of four nodes belonging to the ring link structure, refer to a corresponding part in the first aspect. Details are not described herein again.

One transmission path in the two reachable paths that are included from the first node to the third node is specified, to be used by the first node to send the first traffic. This manner of sending traffic on a specified path can implement non-blocking switching of traffic between nodes. In addition, after receiving a plurality of packets included in the first traffic, the third node serving as a destination node does not need to reorder the plurality of packets, reducing a requirement for node resources. Further, when the nodes are basic dicing units integrated into a chip of a network device, an area, power consumption, and a delay of the entire chip can be reduced.

In a possible implementation, the second transceiver is configured to receive second traffic on a second transmission path, where the second transmission path of the second traffic includes the third node and the fourth node, and the third node is a source node of the second traffic on the ring link. When the first node is a destination node of the second traffic, and the first node is a basic dicing unit on a chip, the first node may send, through the first transceiver, the second traffic to a network device to which the first node belongs.

In a possible implementation, a binding relationship exists between the first node and the second node, the first transmission path is determined according to a forwarding policy of the first node, and the forwarding policy includes specifying, based on the binding relationship, that the first node needs to send traffic to the third node through the second node.

In a possible implementation, 4N or 4N+2 nodes are included on the ring link, where the first node, the second node, the third node, and the fourth node are arranged in sequence in the 4N or 4N+2 nodes, N≥1, and N is an integer.

In a possible implementation, when 8N or 4N+2 nodes are included on the ring link, the first transmission path passes through a plurality of nodes including the second node.

In a possible implementation, the first traffic includes a packet, the packet includes indication information used to indicate the first transmission path, and the second transceiver sends the packet to the third node.

According to a fourth aspect, this application provides a chip system. The chip system includes a first node, the first node belongs to a ring link, and the first node, a second node, a third node, and a fourth node are arranged in sequence on the ring link. The first node sends first traffic to the third node, where two reachable paths with equal hop counts are included from the first node to the third node, the first node sends the first traffic to the third node on a preset first transmission path, the first transmission path passes through the second node, and the first transmission path is one of the two reachable paths with equal hop counts. The chip system may be an internal system that is in a network device and that includes one independent chip, or may be an internal system that is in a network device and that includes a plurality of chips.

In a possible implementation, the first node is configured to receive second traffic on a second transmission path, where the second transmission path of the second traffic includes the third node and the fourth node, and the third node is a source node of the second traffic on the ring link.

In a possible implementation, a binding relationship exists between the first node and the second node, the first transmission path is determined according to a forwarding policy of the first node, and the forwarding policy includes specifying, based on the binding relationship, that the first node needs to send traffic to the third node through the second node.

In a possible implementation, 4N or 4N+2 nodes are included on the ring link, where the first node, the second node, the third node, and the fourth node are arranged in sequence in the 4N or 4N+2 nodes, N≥1, and N is an integer.

In a possible implementation, when 8N or 4N+2 nodes are included on the ring link, the first transmission path passes through a plurality of nodes including the second node.

In a possible implementation, the first traffic includes a packet, and the first node is further configured to encapsulate indication information indicating the first transmission path into the packet, and send the packet to the third node.

In a possible implementation, when the chip system may further include the third node, the third node in the chip system further receives the packet in the first traffic, and processes the packet based on the indication information in the packet, where the processing may be, for example, storing data in the packet or continuing to forward the data in the packet. When the chip system further includes the second node, the second node in the chip system further receives the packet, and the second node updates the indication information in the packet. The update operation may be, for example, popping up a label identifying the second node, where the label may be encapsulated into, for example, a packet header of the packet.

According to a fifth aspect, this application provides a network device for traffic transmission, where the network device includes a transceiver and a first node. The first node belongs to a ring link, the ring link includes the first node, a second node, a third node, and a fourth node that are arranged in sequence, and two reachable paths with equal hop counts are included from the first node to the third node.

The transceiver is configured to receive first traffic, and send the received first traffic to the first node. The first node is configured to send the first traffic to the third node on a preset first transmission path, where the preset first transmission path includes the second node, and the first transmission path is one of the two reachable paths with equal hop counts.

In a possible implementation, the first node receives second traffic on a second transmission path, where the second transmission path of the second traffic includes the third node and the fourth node, and the third node is a source node of the second traffic on the ring link.

In a possible implementation, a binding relationship exists between the first node and the second node, the first transmission path is determined according to a forwarding policy of the first node, and the forwarding policy includes specifying, based on the binding relationship, that the first node needs to send traffic to the third node through the second node.

In a possible implementation, 4N or 4N+2 nodes are included on the ring link, where the first node, the second node, the third node, and the fourth node are arranged in sequence in the 4N or 4N+2 nodes, N≥1, and N is an integer.

In a possible implementation, when 8N or 4N+2 nodes are included on the ring link, the first transmission path passes through a plurality of nodes including the second node, where N≥1, and N is an integer.

In a possible implementation, the first traffic includes a packet, and that the first node sends the first traffic to the third node on the preset first transmission path includes: The first node encapsulates indication information used to indicate the first transmission path into the packet, and sends the packet to the third node.

In a possible implementation, the first node is packaged in a chip.

According to a sixth aspect, this application provides a network system for traffic transmission, where the network system includes a first network device and a second network device. The first network device includes a first node, the second network device includes a third node, the first node and the third node belong to one ring link, and the ring link includes the first node, a second node, the third node, and a fourth node in sequence.

The first network device is configured to send first traffic through the first node, where two reachable paths with equal hop counts are included from the first node to the third node of the second network device, the first traffic is sent to the third node on a preset first transmission path, the first transmission path passes through the second node, and the first transmission path is one of the two reachable paths with equal hop counts. The second network device is configured to receive the first traffic through the third node.

In a possible implementation, the second network device is configured to send second traffic through the third node, where the second traffic is sent to the first node on a preset second transmission path, the second transmission path of the second traffic includes the third node and the fourth node, and the third node is a source node of the second traffic on the ring link. The second node or the fourth node may be located in the first network device, may be located in the second network device, or may be located in another network device. The first network device is configured to receive the second traffic through the first node.

In a possible implementation, a binding relationship exists between the first node and the second node, the first transmission path is determined according to a forwarding policy of the first node, and the forwarding policy includes specifying, based on the binding relationship, that the first node needs to send traffic to the third node through the second node.

In a possible implementation, 4N or 4N+2 nodes are included on the ring link, where the first node, the second node, the third node, and the fourth node are arranged in sequence in the 4N or 4N+2 nodes, N≥1, and N is an integer.

In a possible implementation, when 8N or 4N+2 nodes are included on the ring link, the first transmission path passes through a plurality of nodes including the second node, where N≥1, and N is an integer.

In a possible implementation, the first traffic includes a packet, and the first network device is configured to encapsulate, through the first node, indication information used to indicate the first transmission path into the packet, and send the packet to the third node of the second network device. The second network device is configured to receive the packet through the third node.

For the technical effects brought by any one of the designs in the third aspect to the sixth aspect, refer to the technical effects brought by a corresponding design in the first aspect. Details are not described herein again.

DESCRIPTION OF EMBODIMENTS

Embodiments of this application provide a method, a node, and a network system for traffic transmission, to implement non-blocking switching of traffic while saving network resources.

Figure 1:
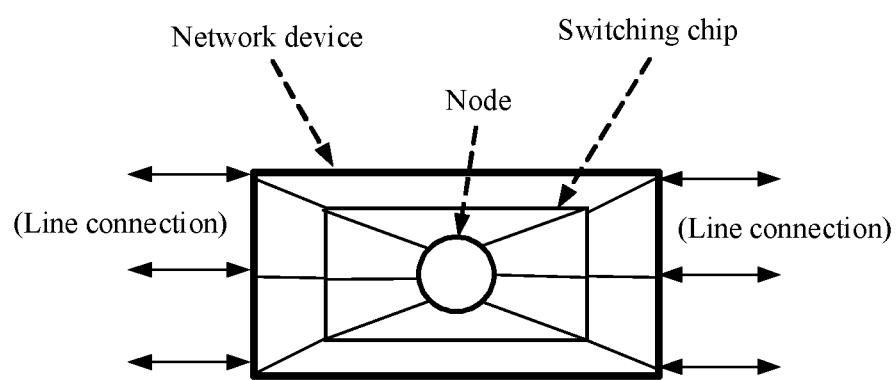
FIG. 1 is a schematic diagram of a structure of a node according to an embodiment of this application.

With a surge in a network data volume, a switching capability of a network device such as a network switching device needs to be continuously improved. A switching capability of a network device is related to a quantity of nodes that have a data switching capability in the network device. It should be noted that a node mentioned in embodiments of this application represents a basic dicing unit in an entire silicon chip or wafer in a semiconductor process, for example, a die. A node may be packaged in a switching chip in a network device, as shown in FIG. 1. A larger quantity of nodes included in the network device indicates a stronger switching capability that can be provided by the network device. When the network device includes a plurality of nodes, each network device may include a plurality of switching chips, and each switching chip may include one or more nodes.

Figure 2A:
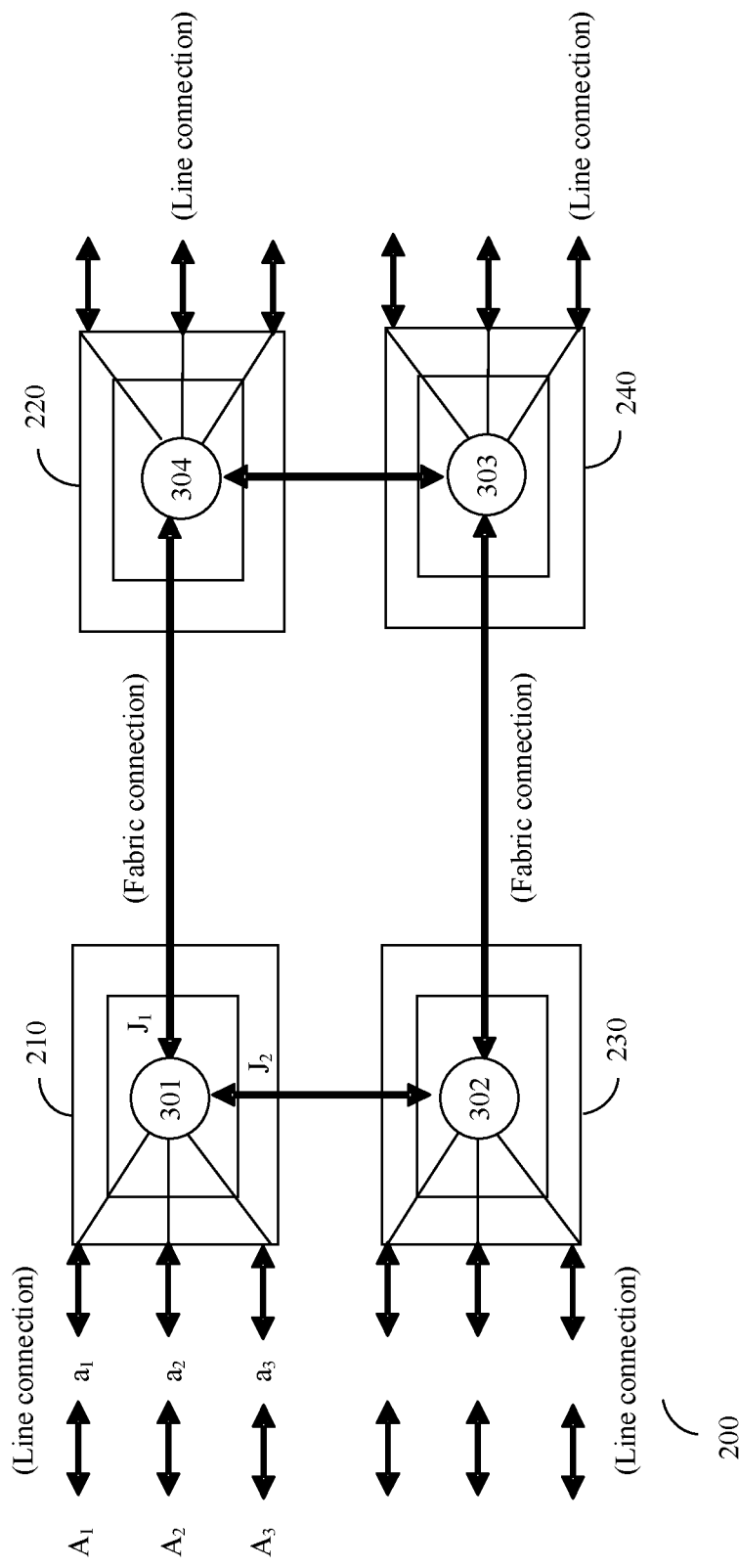
FIG. 2a is a schematic diagram of a structure of a network system according to an embodiment of this application.
Figure 2B:
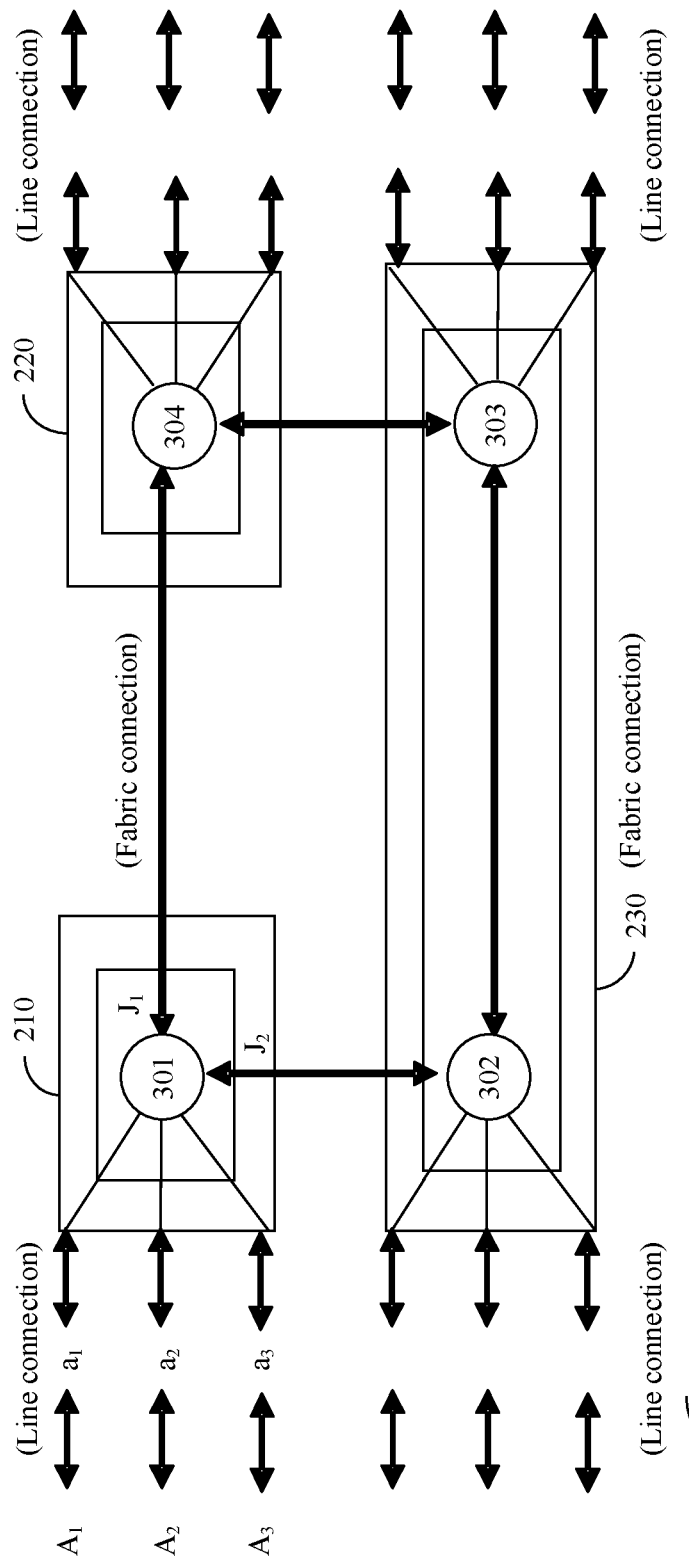
FIG. 2b is a schematic diagram of a structure of another network system according to an embodiment of this application.

In an application scenario, a system 200 may include one or more network devices, and each network device may include one or more nodes. When the system 200 includes three or more nodes, these nodes may be connected in sequence to form a ring link. For example, the system 200 includes four nodes. As shown in FIG. 2a, the system 200 may include four network devices shown in FIG. 1: network devices 210 to 240. The network system 200 may be used as a network device to implement data exchange. Each of the network devices 210 to 240 in the network system 200 includes one switching chip, and each switching chip includes one node. In some other application scenarios, four nodes 301 to 304 may alternatively be distributed in another manner. For example, as shown in FIG. 2b, the four nodes 301 to 304 may alternatively be distributed in the three network devices 210 to 230 in the network system 200. The network device 210 includes the node 301, the network device 220 includes the node 304, and the network device 230 includes the node 303 and the node 302. That is, the four nodes 301 to 304 may be evenly or unevenly distributed in a plurality of network devices, or all of the four nodes may be included in one network device. When the four nodes 301 to 304 are distributed in a plurality of network devices, the system 200 is a network system including the plurality of network devices in which the four nodes are located. When the four nodes 301 to 304 are integrated in one network device, the system 200 is a device internal system including the four nodes. Regardless of which specific distribution manner is used, when the four nodes 301 to 304 can be connected to each other to form a ring through links between the nodes, the four nodes jointly form a 4-node ring network architecture. In a specific implementation, any two adjacent nodes among the four nodes forming the ring may be bidirectionally connected. The foregoing uses the 4-node ring network architecture as an example. It may be understood that a quantity of nodes in a ring link structure may be any value greater than or equal to 3.

Figure 3:
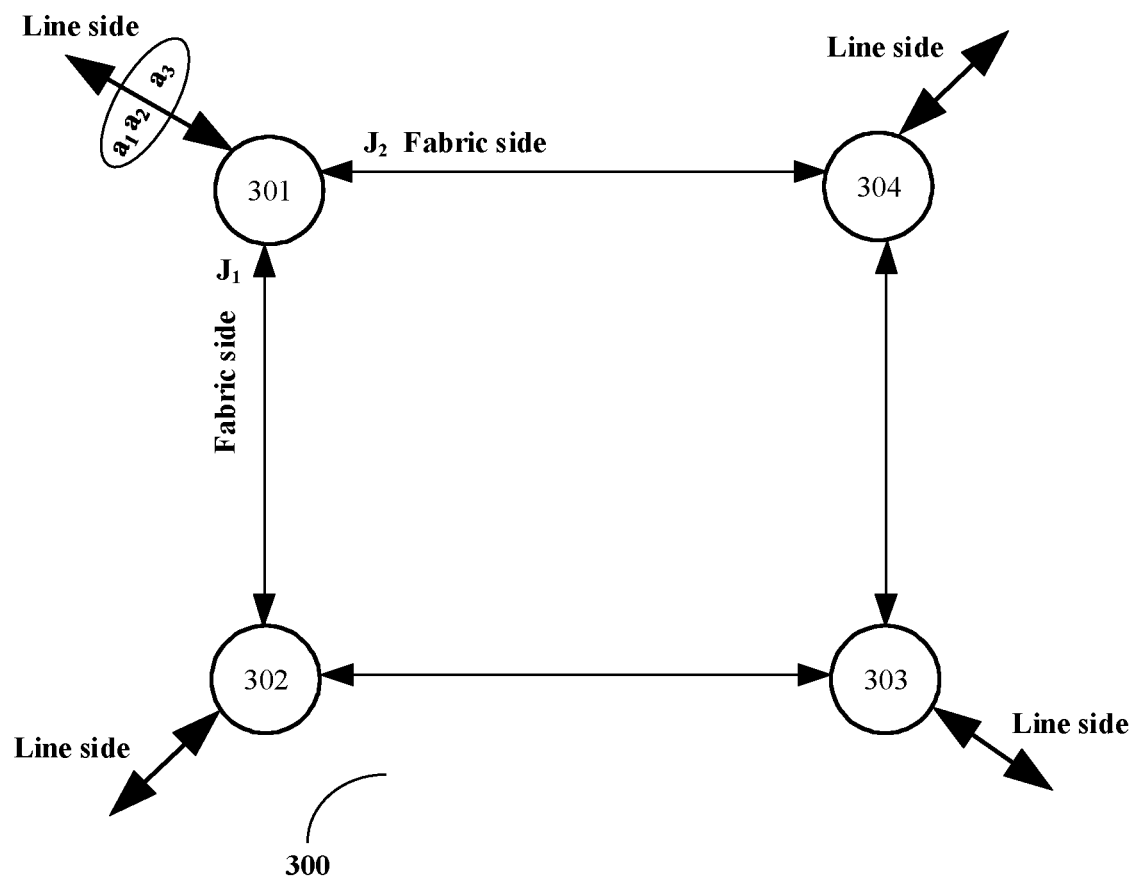
FIG. 3 is a schematic diagram of a 4-node ring network structure according to an embodiment of this application.

FIG. 3 is a schematic diagram of a 4-node ring network architecture 300. The architecture may be applied to one network device, or may be applied to a network system including a plurality of network devices. The 4-node ring network architecture 300 includes a node 301, a node 302, a node 303, and a node 304. The four nodes are connected in sequence to form a ring link structure between the four nodes. The node 301, the node 302, the node 303, and the node 304 each include one group of line ports, configured to connect to a line port of a network device to which the node 301, the node 302, the node 303, and the node 304 each belong. The node 301, the node 302, the node 303, and the node 304 each further include two groups of fabric ports, configured to separately connect to other two adjacent nodes in the ring network architecture. For example, the node 301 includes fabric ports J1 and J2, where the fabric port J1 is configured to connect to the node 302, and the fabric port J2 is configured to connect to the node 303. The node 301 further includes line ports a1, a2, and a3, configured to respectively connect to line ports A1, A2, and A3 of the network device to which the node 301 belongs. It may be understood that, during actual application, any quantity of line ports of each node may be set as required, and the line ports of each node are separately connected to line ports on a network device correspondingly. In an embodiment, a piece of traffic (or one or more packets forming the traffic) may flow into a node in the 4-node ring network architecture from a network device to which the node belongs through one line port of the node. In another embodiment, a piece of traffic may flow into a node in the 4-node ring network architecture from a network device to which the node belongs through a plurality of line ports of the node.

A transmission path of a packet (or traffic including a group of packets) in a multi-node network may be a path formed by nodes through which the packet passes in a process that starts when the packet enters a source node and ends when the packet leaves a destination node. The source node is the $1^{st}$ node that the packet passes through on the transmission path, and the destination node is the last node that the packet passes through on the transmission path. A network device in which the source node is located may be referred to as a source network device, and a network device in which the destination node is located may be referred to as a destination network device. It should be noted that in some embodiments, for example, when a plurality of nodes are located in a same network device, the source network device and the destination network device are a same network device. The source node may receive the packet from a line port of the source network device. The destination node may send the packet to a line port of the destination network device. If the packet further passes through one or more other nodes in a process in which the packet is sent from the source node to the destination node, the one or more other nodes are referred to as intermediate nodes. When being transmitted, a group of packets that belong to a same piece of traffic pass through a same source node and a same destination node but may pass through a same transmission path or two different transmission paths in the ring network architecture. The one transmission path or the two different transmission paths may pass through zero intermediate nodes, one intermediate node, or a plurality of intermediate nodes, which is specifically related to a total quantity of nodes in the ring network architecture and relative locations of the source node and the destination node. In the 4-node ring network architecture 300 shown in FIG. 3, an example in which the source node is 301 and the destination node is 303 is used, and optional transmission paths include 301->302->303 and 301->304->303. It may be understood that, in the 4-node ring network architecture, the source node is the $1^{st}$ node through which the traffic flows in a 4-node ring link, and the destination node is the last node through which the traffic flows in the 4-node ring link. The source node, the destination node, and the intermediate node are relative to each other. For example, a node is a source node for one piece of traffic, and may be a destination node or an intermediate node for another piece of traffic.

The foregoing descriptions are mainly based on an example in which a node is a basic dicing unit on a chip of a network device. It may be understood that, in another application scenario, the node may alternatively be a network device. In this embodiment, a plurality of network devices (that is, nodes) on a ring link jointly form the system 200. A network device serving as a node on the ring link may receive traffic through a network port, and may further forward the traffic through a network port.

When a network architecture is specifically designed, in addition to a switching capability of a node in the network architecture, other indicators generally need to be considered, for example, a fabric speedup and a delay of each node in the network architecture during non-blocking switching. The following first describes two concepts:

1. Non-blocking switching: A condition that a network architecture satisfies non-blocking switching may include: In the network architecture, if traffic input from a line ingress of each node is less than or equal to a bandwidth of the line ingress of the node, and output traffic destined for a line egress of each node is less than or equal to a bandwidth of the line egress of the node, the traffic is not blocked in the network architecture.

2. Fabric speedup of a node: Fabric speedup of a node=Total fabric bandwidth of the node/Total line bandwidth of the node. The total line bandwidth is a total bandwidth corresponding to a line port of a node. When the node has one line port, the total line bandwidth is a bandwidth corresponding to the line port of the node. When the node has a plurality of line ports, the total line bandwidth is a sum of bandwidths corresponding to the plurality of line ports of the node. Similarly, the total fabric bandwidth is a bandwidth (or a sum of bandwidths) corresponding to one fabric port (or more fabric ports) of a node. The node 301 shown in FIG. 3 is used as an example. Fabric speedup of the node 301=(Bandwidth of a link between the node 301 and the node 302+Bandwidth of a link between the node 301 and the node 304)/Total line bandwidth of the node 301. A smaller fabric speedup indicates that multi-node non-blocking switching can be implemented by designing a smaller link bandwidth for the network architecture. The node 301 is still used as an example. When load balancing is performed based on a shortest path first algorithm, a bandwidth of a fabric side link between the node 301 and each of the other two nodes (for example, a bandwidth of a fabric side link between 301 and 302) needs to be not less than the total line bandwidth of the node 301, to ensure non-blocking switching of the node 301 in the 4-node ring network architecture. Therefore, a fabric speedup of the node 301 is at least (1.0+1.0)/1.0=2.0. It may be understood that, a line side and the fabric side are named differently to distinguish whether an object from which or to which the node receives or sends traffic is a node on the ring link. During specific implementation, the line side and the fabric side may process the traffic in a same manner, and a line port and a fabric port may be implemented in a same manner.

For traffic flowing into an M-node (where M≥1 and M is an integer) ring network architecture, the shortest path first algorithm may be used to implement fast forwarding of the traffic, to satisfy non-blocking switching of the traffic between any two nodes. In the ring link structure, when two reachable paths from a source node to a destination node pass through different hops of nodes, the shortest path first algorithm is used to select a reachable path with a smaller hop count to forward the traffic. When two reachable paths from the source node to the destination node pass through same hops of nodes, according to the shortest path first algorithm, load balancing of the traffic may be performed by using the two reachable paths, that is, the traffic is evenly sent on the two shortest reachable paths from the source node to the destination node. FIG. 3 is still used as an example. For a 4-node network satisfying the ring network architecture, if the shortest path first algorithm is used to implement load balancing, a transmission path of traffic (that is, a group of packets) sent from the source node 301 to the destination node 302 is 301->302, a transmission path of traffic sent from the source node 301 to the destination node 303 is 301->303, and a transmission path of traffic sent from the source node 301 to the destination node 304 is 301->304. That is, the source node 301 selects a fabric side link directly connecting the source node and the destination node to send the traffic to the destination node. Transmission paths of the traffic sent from the source node 301 to the destination node 303 include 301->302->303 and 301->304->303. For example, the two transmission paths each may be used to transmit 50% of the traffic, to implement load balancing during traffic transmission.

In a K-node ring network architecture, the shortest path first algorithm is used to transmit traffic, so that a network transmission delay is low. When there are two reachable paths with a same hop count between a source node and a destination node, after two parts of the traffic reach the destination node along the two reachable paths, because a sequence in which packets in the two parts of traffic reach the destination node may be inconsistent with a sequence in which the packets are sent from the source node, the destination node needs to reorder the packets in the received two parts of traffic, to ensure normal use of service traffic. Such reordering calculation increases a chip area, power consumption, and a delay of the destination node. The chip area may be specifically related to storage space reserved on the chip, resources of a buffer circuit and an ordering circuit that need to be consumed for reordering, or the like. Embodiments of this application provide a method for traffic transmission on a ring link, to avoid, while implementing non-blocking switching of traffic and not affecting a fabric speedup requirement of a node, node resource consumption caused by a traffic reordering operation of a destination node, thereby better meeting an overall requirement of a network architecture design.

Figure 4A:
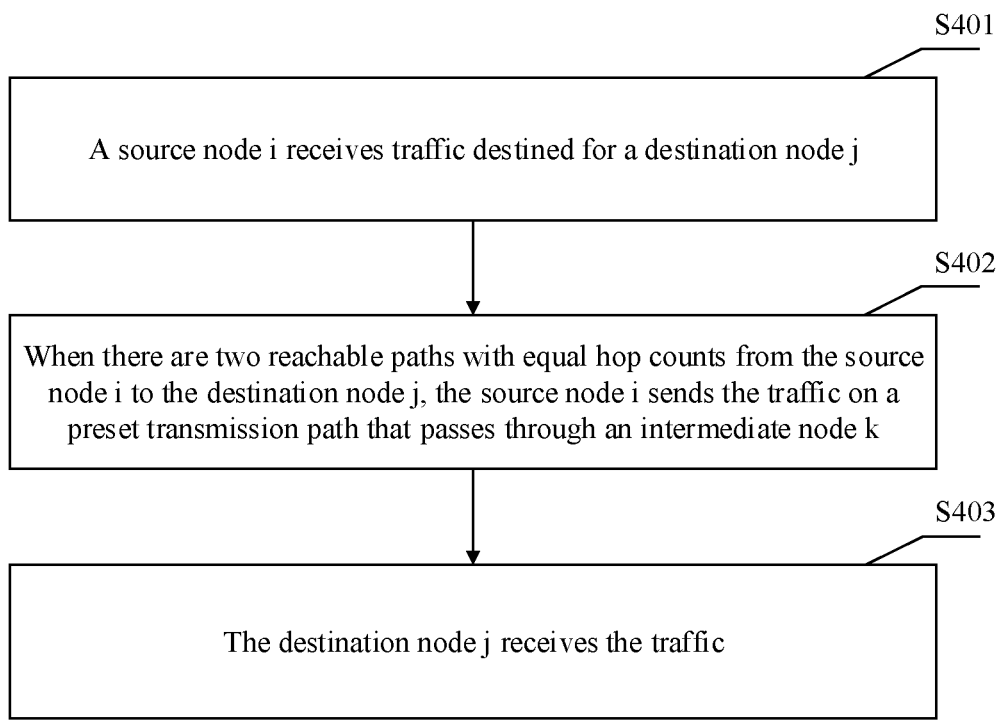
FIG. 4a is a schematic diagram of a method for traffic transmission according to an embodiment of this application.

An embodiment of this application provides a method for traffic transmission, applied to a ring link. The 4-node ring network architecture 300 shown in FIG. 3 is still used as an example. It is assumed that the node 301 receives traffic L from a corresponding line port a1, and the traffic L needs to flow out from a line port b corresponding to the node 303. That is, for the traffic L, the node 301 is a source node, and the node 303 is a destination node. As shown in FIG. 4a, the method includes the following steps.

S401. A source node i receives traffic destined for a destination node j.

Traffic in a ring link structure may be represented by one or more packets forming the traffic, where the one or more packets flow into the ring link from a same node, and flow out of the ring link from a same node. The $1^{st}$ node into which the one or more packets flow is a source node of the traffic on the ring link. The node from which the one or more packets flow is a destination node of the traffic on the ring link. The one or more packets forming the traffic may flow in through one or more line ports of the source node. Specific packets included in a piece of traffic may be determined based on an actual scenario or application requirement. For example, in an embodiment, all packets that flow from a same source node to a same destination node in a period of time may form one piece of traffic. In another embodiment, all packets that belong to a same service and that flow from a same source node to a same destination node may form one piece of traffic. In another embodiment, all packets that flow from one or more ports specified by a same source node to a same destination node form one piece of traffic (where in the two embodiments in which traffic composition is determined based on a service or a port, the mentioned "all packets" may be a relative concept, for example, all packets in a specified time period). In other embodiments, other rules may alternatively be set to determine specific composition of traffic sent from a source node to a destination node. The network structure in FIG. 3 is used as an example. The traffic L received by the source node 301 includes a group of packets B={B1, . . . , Bn, n≥1}. The traffic L is ingress traffic that flows in from the source node 301 and that is destined for the destination node 303, and the ingress traffic may be received by the source node 301 from a line port of a network device in which the source node 301 is located, or may be received from a previous-hop network device.

S402. When there are two reachable paths with equal hop counts from the source node i to the destination node j, the source node i sends the traffic on a preset transmission path that passes through an intermediate node k.

For the traffic L, two reachable paths with equal hop counts exist between the source node 301 and the destination node 303, that is, the path 301->302->303 and the path 301->304->303. In this embodiment, the source node i does not send the traffic L through load balancing on two paths, but sends the traffic L on a preset path, for example, the path 301->302->303 or the path 301->304->303.

S403. The destination node j receives the traffic.

If the source node i sends the traffic L on the specified path 301->302->303, the destination node 303 receives, through the intermediate node 302, the traffic L sent by the source node 301.

In the foregoing process of sending the traffic L from the source node 301 to the destination node 303, a specified path for sending the traffic L is preset in the source node 301. The specified path may be determined according to a forwarding policy of the source node 301. In a possible implementation, the forwarding policy may be specifying a binding relationship between the nodes on the ring link shown in FIG. 3. The binding relationship may include binding between the node 301 and the node 302 and binding between the node 303 and the node 304. For two nodes A and B that have a binding relationship, one node (for example, the node A) needs to send, through the other node (for example, the node B) that has a binding relationship with the node, traffic to a destination node that has two reachable paths with equal hop counts to the node.

Sending of the traffic L is used as an example. If a binding relationship exists between the node 301 and the node 302, the node 301 needs to serve as a source node to send the traffic L to the node 303 through the node 302 that has the binding relationship with the node 301. In this way, when serving as a source node to send traffic to the node 304, the node 302 needs to send the corresponding traffic on a path 302->301->304 based on the binding relationship between the node 301 and the node 302. Similarly, it may also be specified that a binding relationship also exists between the node 303 and the node 304 on the ring link shown in FIG. 3. In this way, when the node 304 serves as a source node to send traffic to the node 301, although there are two reachable paths with equal hop counts from the node 304 to the node 301, that is, a path 304->303->301 and a path 304->302->301, because there is the binding relationship between the node 303 and the node 304, the node 304 sends the corresponding traffic on the path 304->303->301.

The binding relationship between the nodes may be explicit. For example, the binding relationship may be preset and stored on each node, to be used as a constraint to be followed when a transmission path is determined. Alternatively, the binding relationship may be non-explicit, but is used as a principle that needs to be followed when a transmission path is preset on a node, or used as a principle that needs to be followed when a forwarding policy of a node is formulated. For reflecting that a node follows the foregoing principle, when the node sends traffic to a node having two reachable paths with equal hop counts to the node, a corresponding specified path in a traffic sending path table stored in the node includes a node that has a binding relationship with the node. The binding relationship is configured or followed, so that the source node that needs to forward traffic can forward the traffic to the destination node through a node that has the binding relationship with the source node. It can be learned that the binding relationship is not necessarily explicit, provided that such an association relationship between nodes can be reflected in a finally specified forwarding path between the nodes.

Figure 4B:
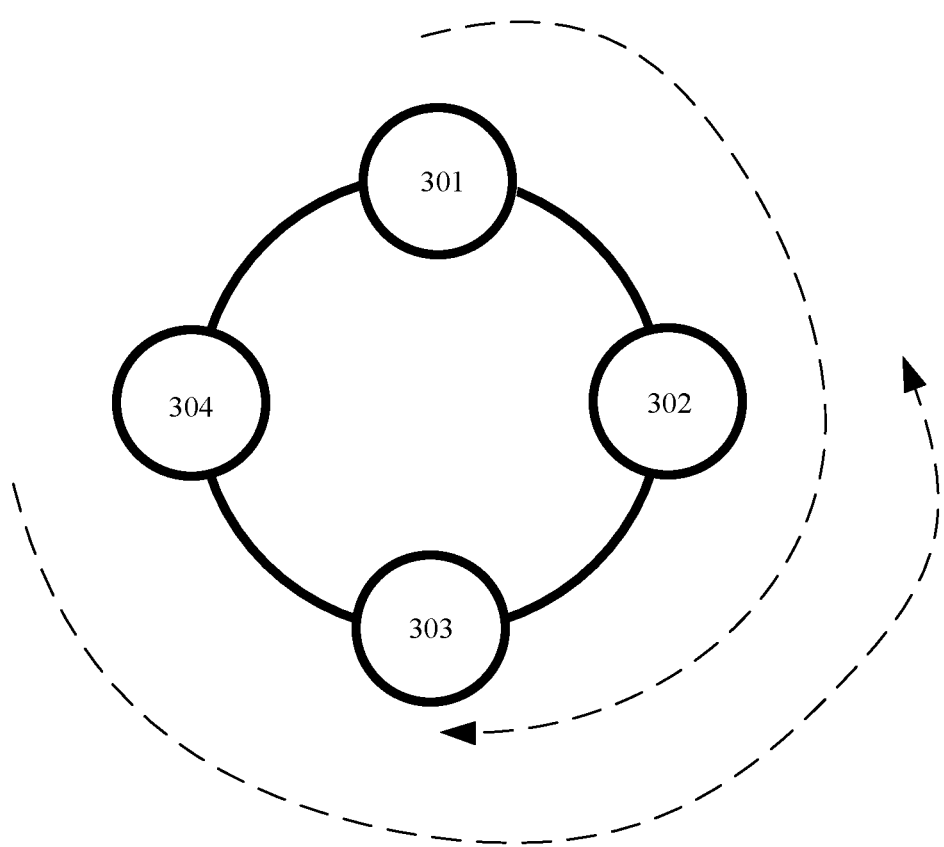
FIG. 4b is a schematic diagram of a traffic transmission path according to an embodiment of this application.

The binding relationship between the nodes on the ring link is configured or followed. FIG. 3 is still used as an example. A transmission path used by the node 301 to send traffic L1 to the node 303 is 301->302->303, and a transmission path used by the node 304 to send traffic L2 to the node 302 is 304->303->302 instead of 304->301->302. Because the traffic L1 and the traffic L2 are sent on two non-overlapping paths on the ring link, even if the traffic L1 and the traffic L2 are sent in a same period of time, when a bandwidth of a transmission link between nodes is limited, a problem of a network conflict caused by simultaneously occupying a link 301->302 does not occur, as shown in FIG. 4b. This reduces network congestion that may be caused in an entire network, and improves traffic sending efficiency and transmission quality on the ring link.

Although in S402, the source node i directly sends, on the specified path, the traffic to the destination node j that has two reachable paths with equal hop counts to the source node i, it may be understood that in some embodiments, S402 may be replaced with the following S4021 to S4023, to send the traffic from the source node to the destination node.

First, concepts in S4021 to S4023 are explained.

That the source node 301 sends the traffic L in FIG. 3 is still used as an example. It is assumed that a total line bandwidth of the source node 301 is 1.0. The bandwidth 1.0 means that a bandwidth of any specified capacity is considered as one unit bandwidth, to facilitate subsequent calculation of traffic allocation and evaluation of indicators such as a fabric speedup. Specifically, for example, one unit bandwidth may be considered as 400 Gbps (where Gbps is a fabric bandwidth unit, and 1 Gbps represents 1000 megabits per second), 800 Gbps, or 12.8 Tbps (where Tbps is a fabric bandwidth unit, and 1 Tbps=1024 Gbps). In addition to the source node 301, it is assumed that total line bandwidths of the other nodes 302, 303, and 304 in the ring network architecture 300 are also 1.0. If a total line bandwidth occupied when the traffic L flows into the source node 301 is a301302 (briefly referred to as a12 below). a12 may also be referred to as a traffic bandwidth, that is, a bandwidth occupied by ingress traffic flowing into the source node 301 and destined for the destination node 302. When the total line bandwidth of the source node 301 is 1.0, the traffic bandwidth a12 may be less than or equal to 1.0. It is assumed that a bandwidth of a fabric side link between the two nodes i and j (i≠j) is $A_{ij}$, where the bandwidth of the fabric side link is a bandwidth of a physical link connecting the node i to the node j, and may also be referred to as a no-load bandwidth. When the fabric side link between the two nodes is a bidirectional link, $A_{ij}=A_{ji}$. However, it may be understood that in other embodiments, bandwidths of links between the two nodes i and j and in different directions may alternatively be different, that is, $A_{ij} \neq A_{ji}$. Total line bandwidths of the nodes may be equal, or may not be equal, and may be correspondingly designed based on a specific requirement of a network device.

S4021. When there are two reachable paths with equal hop counts from the source node i to the destination node j, the source node i determines whether a difference between a traffic bandwidth $a_{ij}$ required for sending the traffic and the bandwidth $A_{ij}$ of the fabric side link between the source node i and the destination node j is greater than a threshold; and if the difference is greater than the threshold, performs S4022; or if the difference is not greater than the threshold, performs S4023.

S4022. The source node i sends a part of the traffic on one of the two reachable paths, and sends the other part of the traffic on the other reachable path.

If the source node i determines that the difference between the traffic bandwidth $a_{ij}$ required for sending the traffic and the bandwidth $A_{ij}$ of the fabric side link between the source node i and the destination node j is large, for example, when the traffic L is sent along only one specified transmission path, congestion may occur in a transmission process of a packet of the traffic L, the source node i may determine, according to a forwarding policy, to use the two reachable paths for load balancing. A proportion of the traffic L carried on each of the two reachable paths may be set based on a specific requirement. For example, if the shortest path first algorithm is followed, a ratio of traffic carried on the two reachable paths may be 1:1. Alternatively, when link bandwidths of the two reachable paths are not equal, an allocation proportion of the traffic L may be determined according to a ratio of the bandwidths of the two links. Alternatively, the source node i may determine an allocation manner of the traffic L according to a principle of preferentially using one of the reachable paths and then using the other reachable path for remaining overflow traffic.

It may be understood that, although an example is given for the load balancing policy determined according to the forwarding policy in S4022, because traffic generally includes a plurality of packets, and lengths of different packets may be different, during actual application, a specific error may be allowed in volumes of the traffic sent by the source node 301 to the destination node 302 along different reachable paths, that is, actual proportions of traffic sent along different paths are not strictly equal to traffic allocation proportions specified in the forwarding policy. In addition, the source node may determine a traffic segmentation granularity based on either of a packet quantity and a packet length, where the packet length includes a byte length of a packet and a unit quantity of the packet. The node 301 is still used as an example of the source node. If it is determined to forward traffic in a ratio of 1:1 on two reachable paths to the destination node 302, the path 301->302->303 is used as a first transmission path, and the path 301->304->303 is used as a second transmission path. It is assumed that the source node 301 receives six packets within a period of time. For example, if sizes of the six packets are approximately the same, a granularity of a traffic allocation proportion may be determined based on a quantity of packets. In this embodiment, in the six packets received by the source node 301, three packets are forwarded along the first transmission path, and three packets are forwarded along the second transmission path. For example, if the traffic segmentation granularity is determined based on the byte length of the packet, and lengths of bytes included in the six packets received by the source node 301 in sequence are 100 bytes, 500 bytes, 200 bytes, 400 bytes, 300 bytes, and 300 bytes, it may be determined that the three packets with the 100-byte length, the 500-byte length, and the 300-byte length are forwarded along the first transmission path and that the three packets with the 200-byte length, the 400-byte length, and the 300-byte length are forwarded along the second transmission path. After a packet enters a device chip, the packet may be segmented into units with a fixed length in the chip for processing. For example, a length of the unit may be 128 bytes. When the packet is to be segmented, if a length of the packet is less than 128 bytes, padding is performed to reach 128 bytes (for example, zeros are padded); or if the length of the packet exceeds 128 bytes, 128 bytes may be intercepted as a unit. For example, if the traffic segmentation granularity is determined based on a quantity of packet units, and quantities of units included in the six packets received by the source node in sequence are 1, 5, 2, 4, 3, and 3, it may be determined that the three packets including one packet unit, five packet units, and three packet units are forwarded along the first transmission path and that the three packets including two units, four units, and three packet units are forwarded along the second transmission path. Packets transmitted along a transmission path may be continuous, or may be discontinuous. This may be specifically determined according to an actual application scenario, or may be obtained through calculation based on a requirement.

S4023. The source node i sends the traffic on a preset transmission path that passes through an intermediate node k.

If the source node i determines, based on the traffic bandwidth $a_{ij}$ required for sending the traffic and the bandwidth $A_{ij}$ of the fabric side link between the source node i and the destination node j, that the bandwidth of the fabric side link between the nodes can support complete non-blocking sending of the traffic L or non-blocking sending within an acceptable range, the source node i transmits all of the traffic L along a preset reachable path.

According to the method for traffic transmission provided in this embodiment of this application, when there are two reachable paths with equal hop counts between the source node and the destination node, the source node may send all of the traffic on one of the specified reachable paths. This can avoid node resource consumption caused by a traffic reordering operation of the destination node, thereby better meeting an overall requirement of a network architecture design. In addition, because the bandwidth of the fabric side link between the source node and the destination node can be designed to meet a non-blocking transmission requirement of ingress traffic, network resources can be saved while a service delay requirement of a network is met.

This embodiment of this application further provides a possible traffic sending path table, for example, the traffic sending path table used to guide traffic sending by the source node i in S403. The traffic sending path table may be, for example, pre-stored in the source node, or may be stored at another storage location independent of the source node, so that the source node can obtain and determine a corresponding forwarding policy. A traffic sending path table used to guide each node on the ring link shown in FIG. 3 to forward traffic is used as an example. Path tables corresponding to the corresponding nodes are shown in Table 1-1 to Table 1-4.

TABLE 1-1

| Sequence number of a source node of traffic | Sequence number of a destination node of the traffic | Traffic sending path |
|---|---|---|
| 301 | 301 | The source node is the same as the destination node, and the traffic is directly sent to a line port of a network device in which the source node is located, without passing through a fabric side link between nodes |
|  | 302 | 301 -> 302 |
|  | 303 | 301 -> 302 -> 303 |
|  | 304 | 301 -> 304 |

TABLE 1-2

| Sequence number of a source node of traffic | Sequence number of a destination node of the traffic | Traffic sending path |
|---|---|---|
| 302 | 301 | 302 -> 301 |
|  | 302 | The source node is the same as the destination node, and the traffic is directly sent to a line port of a network device in which the source node is located, without passing through a fabric side link between nodes |
|  | 303 | 302 -> 303 |
|  | 304 | 302 -> 301 -> 304 |

TABLE 1-3

| Sequence number of a source node of traffic | Sequence number of a destination node of the traffic | Traffic sending path |
|---|---|---|
| 303 | 301 | 303 -> 304 -> 301 |
|  | 302 | 303 -> 302 |
|  | 303 | The source node is the same as the destination node, and the traffic is directly sent to a line port of a network device in which the source node is located, without passing through a fabric side link between nodes |
|  | 304 | 303 -> 304 |

TABLE 1-4

| Sequence number of a source node of traffic | Sequence number of a destination node of the traffic | Traffic sending path |
|---|---|---|
| 304 | 301 | 304 -> 301 |
|  | 302 | 304 -> 303 -> 302 |
|  | 303 | 304 -> 303 |
|  | 304 | The source node is the same as the destination node, and the traffic is directly sent to a line port of a network device in which the source node is located, without passing through a fabric side link between nodes |

The traffic sending path tables 1-1 to 1-4 are a possible example used when the node is a basic dicing unit in a chip of a network device. It may be understood that, when the node is a network device, a similar path table may also be configured in the device to guide the node to perform forwarding. In this embodiment, when a source node and a destination node of traffic are a same node, a packet of the traffic may be decapsulated and stored on the source node, or may be forwarded to a network device outside a ring link structure in which the source node is located. It may be further understood that the traffic sending path tables 1-1 to 1-4 are a possible implementation for configuring a node forwarding policy, and another implementation may alternatively be set based on a requirement to guide a node to forward traffic.

In a possible implementation, redundancy backup may be further considered for a transmission path between nodes. For example, it is preset that an active path on which the node 301 sends traffic to the node 303 is 301->302->303, and a standby path is 301->304->303. In this way, when the node 302 runs normally, all traffic sent by the node 301 to the node 303 is forwarded on the active path; and when the node 302 fails, a path used by the node 301 to send the traffic to the node 303 may be switched to the standby path.

In the method embodiment in FIG. 4a, the 4-node ring link structure shown in FIG. 3 is used as an example. It may be understood that a quantity of nodes forming the ring link structure may be any integer greater than or equal to 3.

When the quantity of nodes is an odd number, two reachable paths with equal hop counts do not exist between any two nodes on the corresponding ring link. In this embodiment, the shortest path first algorithm may be used to forward traffic, or a specified path is pre-determined as a traffic forwarding path according to the shortest path first algorithm.

When the quantity of nodes is an even number, that is, when 4N or 4N+2 nodes are included on the ring link, where N≥1, and N is an integer, for any node on the ring link, the node has a corresponding peer node on the ring link, and there are two reachable paths with equal hop counts from the node to the peer node. In this embodiment, similar to the embodiment in which N=1, that is, similar to the foregoing 4-node ring network structure, when 8N or 4N+2 nodes are included on the ring link, the corresponding method embodiment shown in FIG. 4a may also be used to specify one of the two reachable paths as a transmission path to forward all packets in traffic.

Figure 5A:
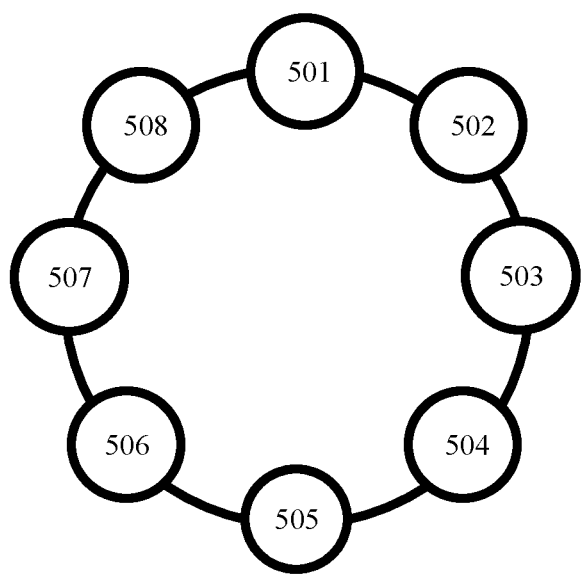
FIG. 5a is a schematic diagram of a ring link structure according to an embodiment of this application.
Figure 5B:
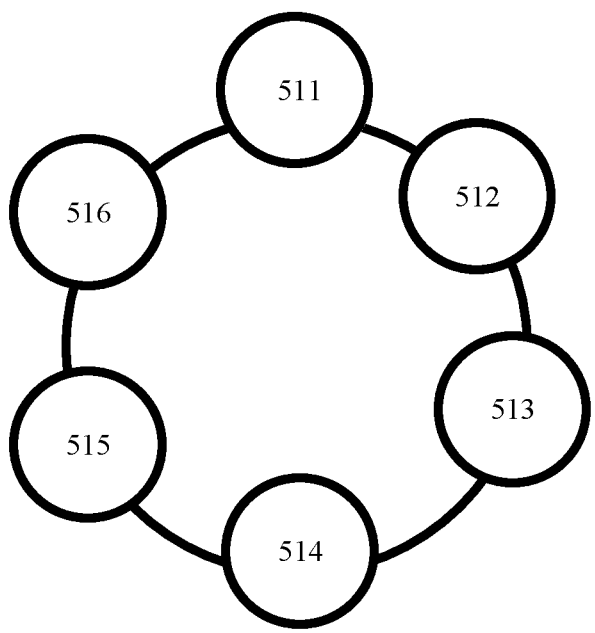
FIG. 5b is a schematic diagram of another ring link structure according to an embodiment of this application.

FIG. 5a and FIG. 5b are schematic diagrams of an 8-node ring link structure and a 6-node ring link structure respectively.

In the 8-node ring link structure, there are two paths with equal hop counts from a node 501 to a node 505. Therefore, the node 501 may send traffic to the node 505 on one of preset paths according to a forwarding policy, for example, a path 501->502->503->504. In the 8-node ring link structure, in a possible implementation, according to the forwarding policy followed by the node 501, one of the two paths with equal hop counts may be randomly specified as a preset path for sending traffic. In another possible implementation, according to the forwarding policy followed by the node 501, a corresponding preset path may alternatively be determined based on a binding relationship between nodes. The binding relationship is not necessarily explicit, provided that such an association relationship between nodes can be reflected in a finally determined forwarding path between the nodes. When the preset path between the nodes is to be determined, eight nodes may be first grouped. For example, if the node 501 is used as a start node, in a clockwise direction, odd-numbered nodes on the ring link are grouped into one group, and even-numbered nodes on the ring link are grouped into another group, that is, group N1={501, 503, 505, 507}, and group N2={502, 504, 506, 508}. A binding relationship (or an association relationship used when a path is preset) between nodes in the group N1 or the group N2 is similar to a binding relationship between nodes in the foregoing 4-node ring link. For example, in the group N1, the nodes 501 and 503 are bound, and the nodes 505 and 507 are bound. When a transmission path used by the node 501 to send traffic to the node 505 is set, the transmission path passes through the node 503, that is, the transmission path used by the node 501 to send the traffic to the node 505 is 501->502->503->504->505. Similarly, when the node 503 sends traffic to the node 507, a corresponding transmission path is 503->502->503->508->507. When the node 505 sends traffic to the node 501, a corresponding transmission path is 505->506->507->508->501. When the node 507 sends traffic to the node 503, a corresponding transmission path is 507->506->505->504->503. Similarly, in the group N2, the nodes 502 and 504 are bound, and the nodes 506 and 508 are bound, to design a transmission path that needs to be specified when there are two paths with equal hop counts between even-numbered nodes on the ring link. A transmission path between nodes on the 8-node ring link is designed in the foregoing manner. In a same period of time, any two nodes on the link do not send, on a same segment of link, traffic to peer nodes each having two reachable paths with equal hop counts, thereby reducing problems such as network congestion, and improving traffic sending efficiency and transmission quality on the 8-node ring link.

The foregoing 8-node grouping and path designing manner is merely used as an example. During actual application, another manner may be used for designing. For example, any other node on a link is specified as a start node, and grouping is performed in a counterclockwise direction, provided that transmission paths between nodes do not conflict with each other. The foregoing method is mainly used to resolve a path selection problem in a scenario in which two reachable paths with equal hop counts exist. When there is only one reachable path with a shortest length on the 8-node ring link according to the shortest path first algorithm, traffic is directly sent on the shortest path. For example, when the node 501 sends traffic to the node 504, according to the shortest path first algorithm, a transmission path is 501->502->503->504.

In FIG. 4b, the 4-node ring link is used as an example. In FIG. 5a, the 8-node ring link is used as an example. Actually, a manner of designing a transmission path between nodes on the foregoing ring link may also be similarly applied to another ring network with 4N (where N≥3 and N is an integer) nodes. For example, for a 12-node ring link, assuming that 12 nodes form a node set M={521, 522, 523, 524, 525, 526, 527, 528, 529, 530, 531, 532}, every four nodes are grouped into one group, and three groups may be obtained, for example, M1={521, 524, 527, 530}, M2={522, 525, 528, 531}, and M3={523, 526, 529, 532}. Each group may be considered as a 4-node ring network, an association relationship based on which a traffic transmission path is designed between nodes in the group is determined, and a transmission path that needs to be specified between corresponding nodes on the entire 12-node ring link is designed based on the association relationship when two reachable paths with equal hop counts exist.

In the 6-node ring link structure, there are two paths with equal hop counts from a node 511 to a node 514. Therefore, the node 511 may send traffic to the node 514 on one of preset paths according to a forwarding policy, for example, a path 511->512->513. In the 6-node ring link structure, in a possible implementation, according to the forwarding policy followed by the node 511, one of the two paths with equal hop counts may be randomly specified as a preset path for sending traffic. In another possible implementation, according to the forwarding policy followed by the node 511, a corresponding preset path may alternatively be determined based on a binding relationship between nodes. It may be understood that, for the 6-node ring link, because a quantity of nodes on the link is not an integer multiple of 4, the nodes on the link cannot be grouped strictly in a manner the same as that for nodes on a 4N-node ring link, where the manner is grouping four nodes into one group. For the 6-node ring link, a possible method is to group four nodes into one group, and then group the remaining two nodes into another group. A pair of nodes between which there are two reachable paths with equal hop counts may be selected as the remaining two nodes. For example, the six nodes are divided into N1={502, 503, 505, 506} and N2={501, 504}, where 501 and 504 have two reachable paths with equal hop counts to each other. According to the foregoing grouping manner, for path designing of each node in the group N1, refer to the foregoing path designing manner for the 4-node ring network structure, and a transmission path may be randomly specified for a node in the group N2 to reach the other node in the group N2. In this way, although a same segment of link may be occupied in a same period of time in which a node in the N2 group transmits traffic to the other node in the group and a node in the group N1 sends traffic to a peer node that has two reachable paths with equal hop counts, because a node in at least the group N1 can ensure that no link conflict occurs when the node sends traffic to a peer node, a possibility of congestion caused when traffic is sent in a sending network is reduced.

According to the load balancing method shown in FIG. 4a, a source node needs to determine, based on a destination node to which traffic needs to be sent and according to a corresponding forwarding policy, transmission paths corresponding to a plurality of packets forming the traffic. For any one of the plurality of packets, when a node is a basic dicing unit in a chip, the source node may specify a transmission path of the packet by using a method shown in FIG. 6a.

S601. A source node determines a destination node of a packet.

For example, the traffic L needs to be sent from the source node 301 to the destination node 303, and the traffic L includes a plurality of packets including a packet 1, a packet 2, a packet 3, and a packet 4. In S601, the source node 301 determines that a destination node of the packets 1 to 4 is the node 303.

S602. The source node determines whether the destination node is consistent with the source node; and if yes, performs S603; otherwise, performs S604.

The source node 301 determines that the destination node 303 is inconsistent with the source node 301, and performs S604.

S603. The source node sends the packet from a line port of the source node.

When determining that the source node 301 is the destination node, the source node 301 directly sends the packet to a line egress of the source node 301.

S604. The source node determines a path for transmitting the packet.

The source node 301 separately determines paths used to send the packet 1, the packet 2, the packet 3, and the packet 4. For example, if Table 1-1 is used as a node forwarding policy, the source node 301 queries the foregoing Table 1-1, and determines that all of the packets 1 to 4 need to be sent to the node 303 along the path 301->302->303. For another example, if S4021 to S4023 are used as a node forwarding policy, when the source node 301 determines that a difference between a total bandwidth occupied by the traffic L on a line side and a bandwidth of a link between the source node 301 and the destination node 303 is greater than a threshold, load balancing may be separately performed on the packets 1 to 4 along two reachable transmission paths. For example, it is determined that the packet 1 and the packet 2 are forwarded on the first transmission path 301->302->303, and the packet 3 and the packet 4 are forwarded on the second transmission path 301->304->303.

S606. The source node determines indication information of the path corresponding to the packet.

In a possible implementation, the source node determines, through addition, the indication information of the path corresponding to the packet. For example, the source node 301 may include forwarding path indication information in each of the packets 1 to 4. The packet 1 is used as an example. The indication information may be used by each hop of node on the path 301->302->303 to forward a packet on the specified path, specifically, based on a forwarding ranking of the packet 1 on the forwarding path. The indication information includes node identifiers of the intermediate node 302 and the destination node 303 in sequence. Alternatively, the indication information may further include a node identifier of the source node, to identify information about a source node sending a packet. Alternatively, the indication information may include only node information of an intermediate node, and does not include node information of the source node or the destination node. It may be understood that the source node that receives the packet may obtain related information of the source node and/or the destination node from information about an original packet for subsequent packet forwarding. The original packet is a packet that is received by the source node from the line port and that has not been processed by the source node, where the related information of the source node and the destination node may be obtained, for example, from a packet header of the original packet.

The node identifier is used to uniquely identify a node, and the node identifier may be in any identifiable form. For example, the node identifier may be an internet protocol (IP) address or a media access control (MAC) address corresponding to an egress port of the node, may be a corresponding sequence number obtained by mapping an IP address of an egress port of the node, or may be another type of information that can uniquely identify the node. The destination node 303 of the packet 1 is used as an example. An IP address of an egress port of the destination node 303 may be, for example, XX.XX.303.XX (indicating a line egress for sending the packet to the node 303), or may be sequence number information corresponding to an IP address, for example, 303, of the destination node 303.

In some embodiments, the IP address is an IPv4 address or an IPv6 address.

In the foregoing embodiment, an example is provided in which a packet passes through an intermediate node. In another embodiment, for example, when a source node sends a packet to a destination node directly connected to the source node, the source node may directly use indication information (information 611 shown in FIG. 6b) in an original packet without additionally adding indication information. In this case, for example, the source node 301 may directly send the packet to the destination node 302 based on destination node information in the original packet. Optionally, to ensure operation consistency, the source node may alternatively determine indication information of a direct transmission path corresponding to the packet, which is additionally added in the packet. The indication information may specifically include node identifiers of the source node and the destination node, or include only a node identifier of the destination node.

The source node 301 may encapsulate path indication information into a packet header of the packet. For example, the source node 301 encapsulates node identifiers of the intermediate node 302 and the destination node 303 on a corresponding transmission path into a packet header of the packet 1 in a form of a label stack, for example, information 612 shown in FIG. 6b.

S606. The source node sends the packet to a next-hop node of the source node on the path based on the indication information of the path.

For example, the source node 301 sends the packet 1 from a fabric port of the node 301 to the intermediate node 302 on the transmission path based on the information 612 in the packet.

If the path determined in S604 includes an intermediate node, the source node sends, in S606, the packet encapsulated with the indication information to a next-hop intermediate node on the path. When the path determined in S604 does not include an intermediate node, that is, a next hop is the destination node, the source node sends, in S606, the packet encapsulated with the indication information to the destination node. The intermediate node or the destination node that receives the packet including the indication information sent by the source node may receive and/or continue to forward the packet based on the indication information. For example, a method shown in FIG. 7 may be used.

S701. A current node receives a packet sent by a previous node.

As an example, the intermediate node 302 receives the packet sent by the source node 301. Initial indication information included in the packet received by the intermediate node 302 may be, for example, information 711 shown in FIG. 7.

S702. The current node determines, based on indication information of the packet, whether the current node is a destination node of the packet; and if the current node is a destination node of the packet, performs S703; otherwise, performs S704.

If the current node is the destination node, when the destination node finds, when receiving the packet, that a node identifier in the indication information is the destination node itself, regardless of whether the indication information is in an information part (for example, the information 512) included by the source node or in an original packet (for example, the information 511), the current node determines that the current node is the destination node of the packet, and performs S703. It should be noted that, when the indication information sent by the source node further includes information about the source node, the destination node may find that the indication information further includes a node identifier of the source node.

If the current node is an intermediate node, when the intermediate node finds, when receiving the packet, that the intermediate node is not the destination node of the packet, S704 is performed. For example, the finding manner may be that a label stack used to carry the indication information includes two or more node identifiers, or that an indication value used to indicate a quantity of node identifiers still included in a label stack is not 1. Alternatively, another determining manner may be used. This is not uniquely limited herein. For example, the intermediate node 302 may determine, based on the indication information in the received packet, that the intermediate node 302 is not the destination node of the packet.

S703. The current node sends the packet to a line egress of the current node.

The current node serving as the destination node directly sends the packet to the line egress of the destination node.

S704. The current node processes the indication information, and sends the packet including processed indication information to a next-hop node.

For example, the intermediate node 302 may remove (where a length of a field used to store node identifiers becomes shorter) or erase (where a length of a field used to store node identifiers remains unchanged, but information corresponding to the $1^{st}$ node identifier in the label stack is empty) the $1^{st}$ node identifier from a label stack in a packet header of the packet. Alternatively, the node identifier field in the label stack is not modified, but an indication field is additionally set to indicate a quantity of valid node identifiers in the node identifier field. In this case, the intermediate node 302 only needs to modify a value of the indication field. After processing the indication information, the intermediate node 302 generates the processed indication information (the information 711 shown in FIG. 7), and then sends the packet to a next node on the second transmission path, that is, the destination node 303, through a fabric side link.

Figure 6A:
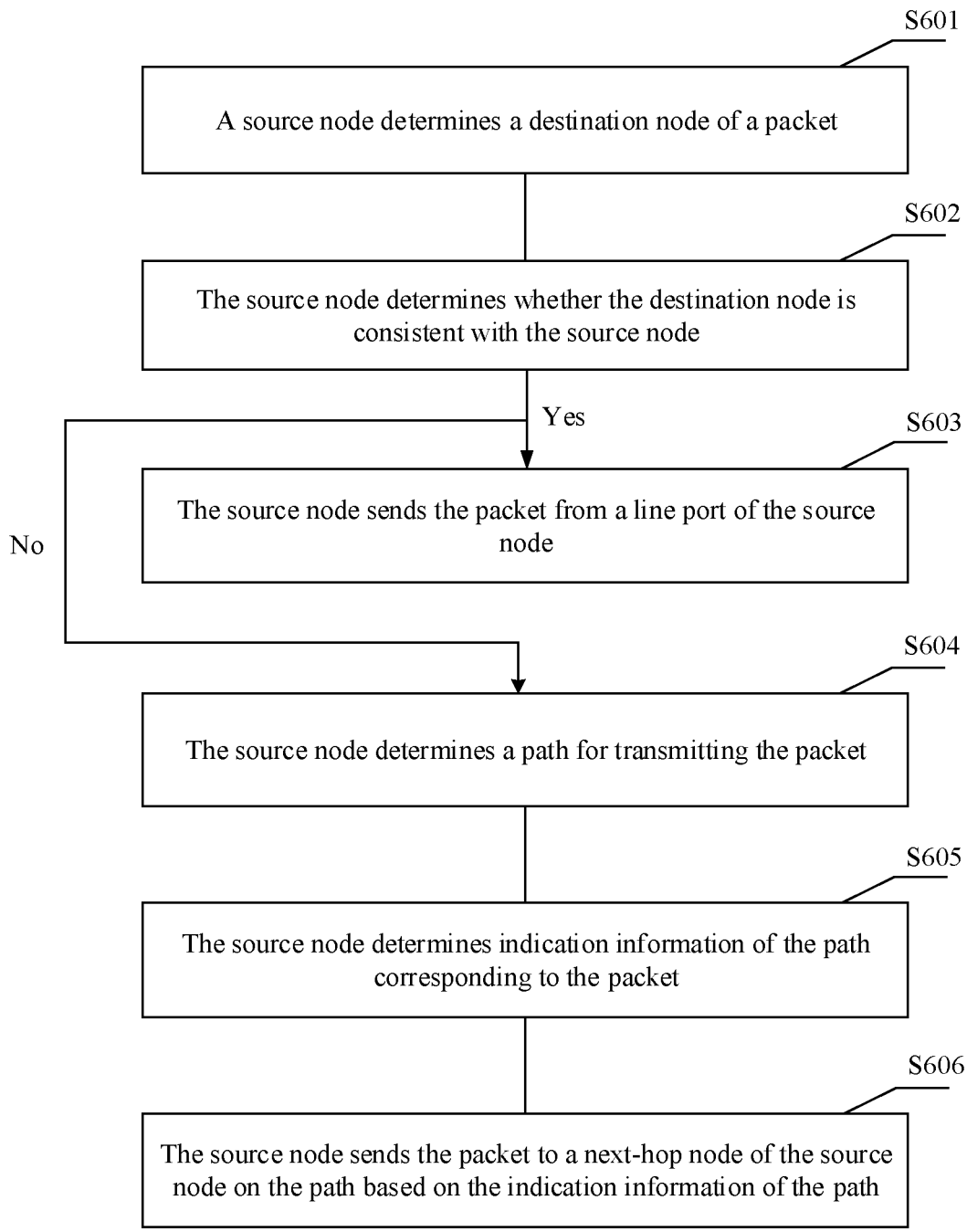
FIG. 6a is a schematic diagram of a packet processing method according to an embodiment of this application.
Figure 6B:
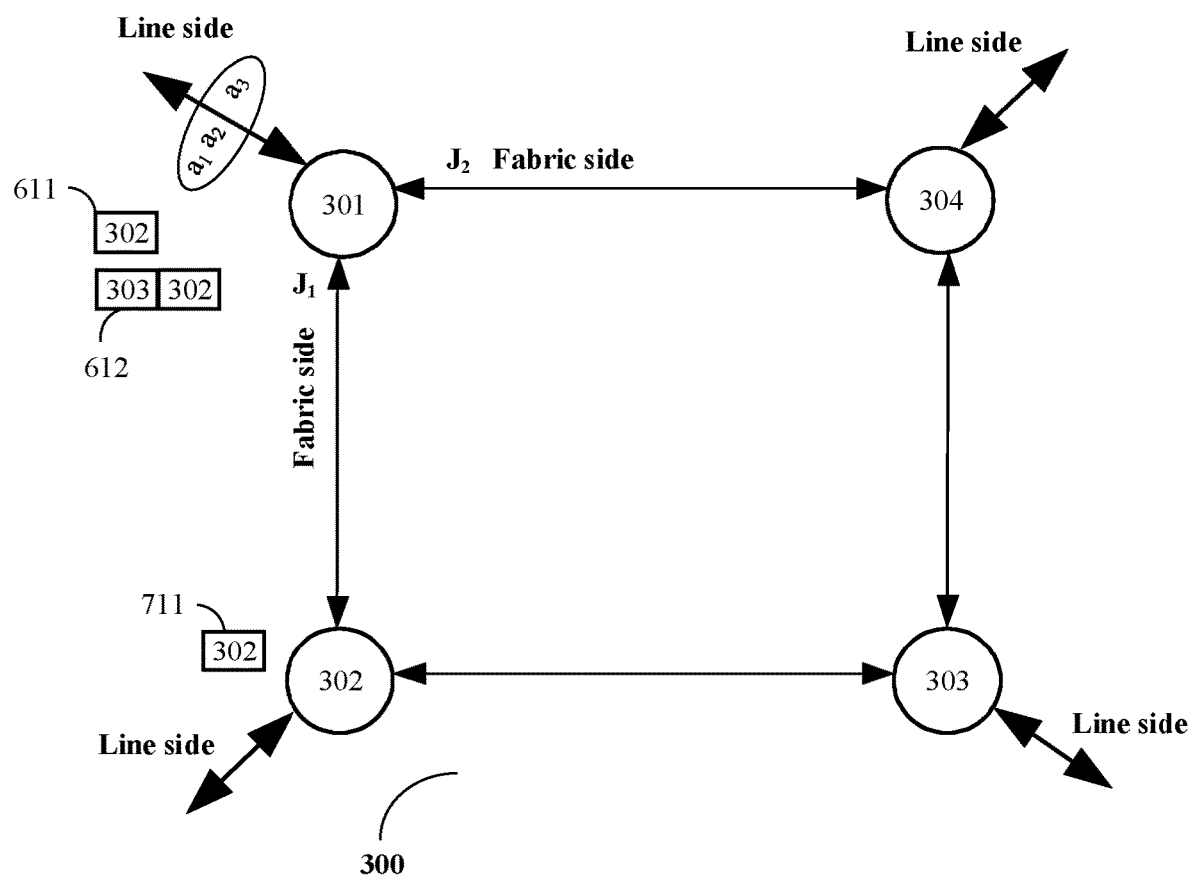
FIG. 6b is a schematic diagram of packet encapsulation according to an embodiment of this application.
Figure 7:
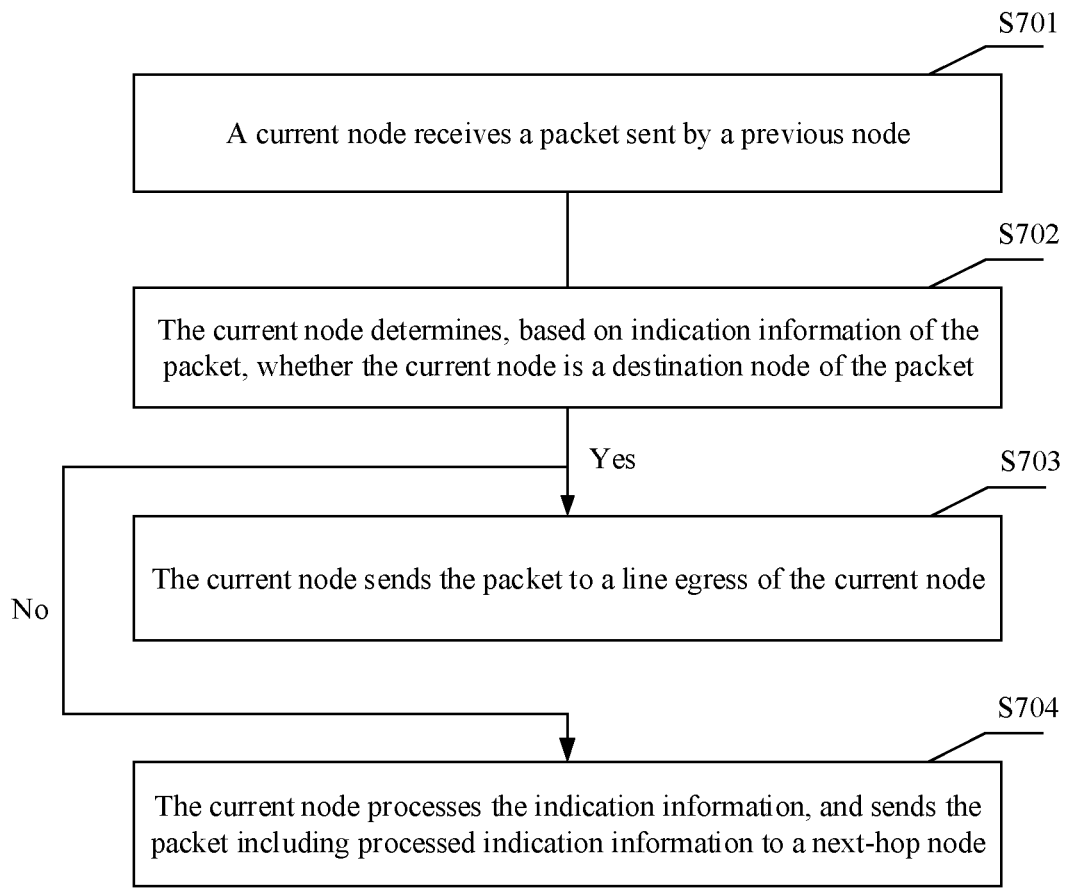
FIG. 7 is a schematic diagram of another packet processing method according to an embodiment of this application.

According to the methods shown in FIG. 6a, FIG. 6b, and FIG. 7, the traffic can be successfully sent from the source node to the destination node along a specified path.

It may be understood that, in the foregoing example, the 4-node ring network architecture shown in FIG. 3 is used as an example. When the ring network includes more nodes, a packet transmission path may pass through two or more intermediate nodes. In this case, similarly, information about each intermediate node also needs to be encapsulated into indication information, to indicate each node on the path to forward a packet based on the indication information.

Figure 8:
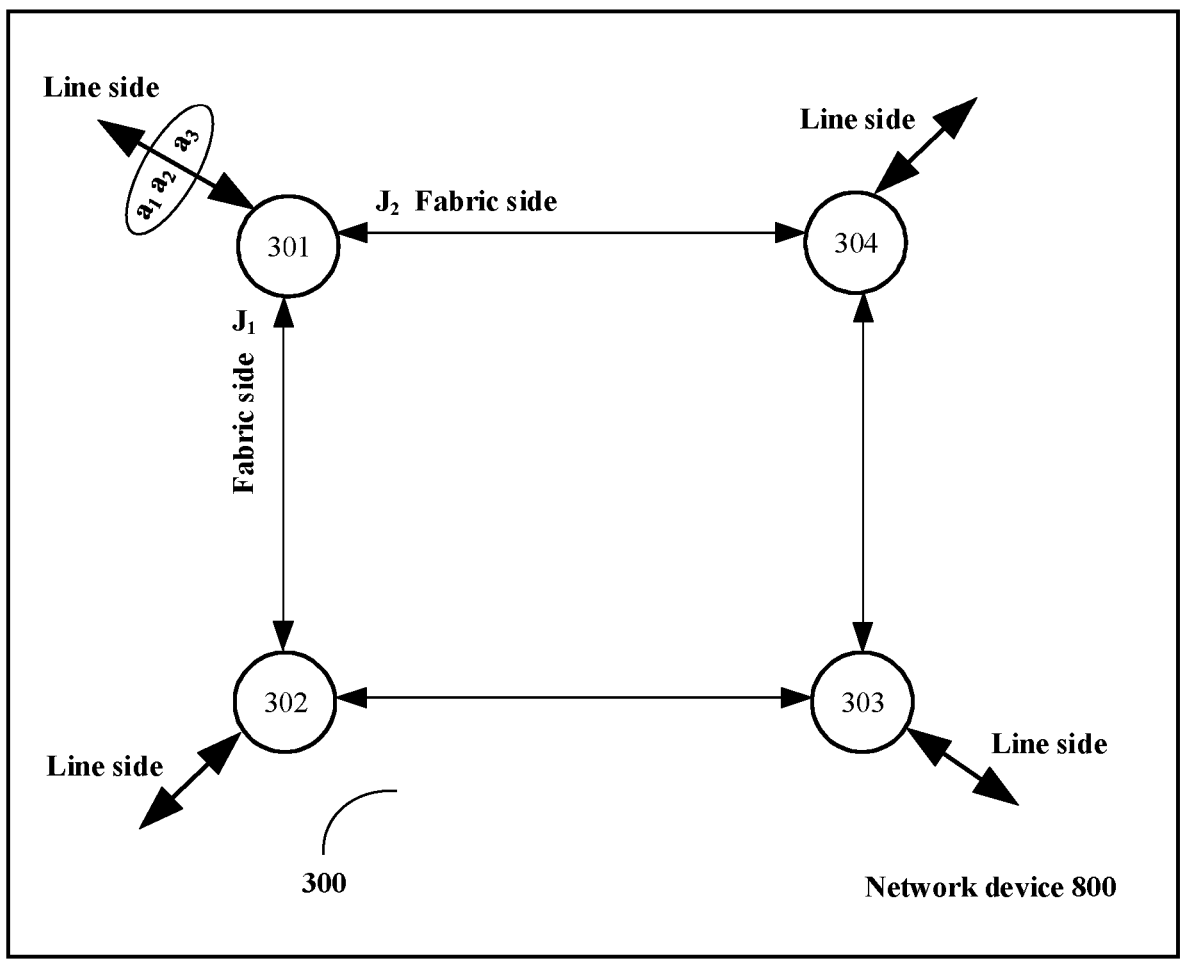
FIG. 8 is a schematic diagram of a structure of a network device according to an embodiment of this application.

In a possible application scenario of the foregoing method embodiments, the method may be applied to a network device 800 shown in FIG. 8. The network device 800 includes four nodes in total: a node 301, a node 302, a node 303, and a node 304, and the four nodes are connected in sequence to form a 4-node ring link, that is, the four nodes forming the ring link are located in a same network device 800. The node 301, the node 302, the node 303, and the node 304 each include a network-side port, which is configured to connect to a network-side port of another external network device. The node 301, the node 302, the node 303, and the node 304 each further include at least two groups of switch ports, and the two groups of switch ports of each node are configured to connect other two adjacent nodes. In an actual application scenario, the network device 800 may be specifically a network switching device, for example, a network device having a packet forwarding function, such as a router or a switch. The nodes 301 to 304 may be basic dicing units integrated in the network device 800, for example, dies, and may be specifically located on one or more switching chips. Alternatively, the network device 800 may be specifically a switching board in a device. The switching board includes one or more switching chips, and the four nodes are located on the one or more switching chips.

When any two nodes are bidirectionally interconnected, bidirectional link bandwidths for interconnection between the any two nodes may or may not be equal, and line bandwidths of the nodes may or may not be equal. Corresponding designs may be implemented based on specific requirements of the network device.

In an embodiment, the node 301, the node 302, the node 303, and the node 304 may be packaged in one switching chip in the network device 800. In another embodiment, the node 301, the node 302, the node 303, and the node 304 may alternatively be packaged in two switching chips in the network device 800. Each switching chip may include two nodes; or one switching chip includes one node, and the other switching chip includes three nodes. In still another embodiment, the node 301, the node 302, the node 303, and the node 304 may alternatively be packaged in three switching chips in the network device 800. Two switching chips each include one node, and the other switching chip includes two nodes. In yet another embodiment, the node 301, the node 302, the node 303, and the node 304 may alternatively be packaged in four switching chips in the network device 800. Each switching chip includes only one node.

For a piece of traffic, any node in the network device 800 may be used as a source node of the traffic, and any node may be used as a destination node of the traffic. In an embodiment, the source node and the destination node may be a same node. For example, a source node of traffic L is the node 301, and a destination node of the traffic L is the node 303. The source node 301 and the destination node 303 may separately perform functions performed by corresponding nodes described in the foregoing method embodiments, and achieve corresponding technical effects, as shown in FIG. 3 to FIG. 4b and FIG. 6a to FIG. 7. Details are not described herein again.

The foregoing uses an example in which the network device 800 includes four nodes forming a ring link. It may be understood that the network device 800 may further include 8N or 4N+2 nodes forming a ring link, where N≥1, and N is an integer, as shown in FIG. 5a and FIG. 5b, and performs functions performed by the nodes described in the foregoing method embodiments.

Figure 9:
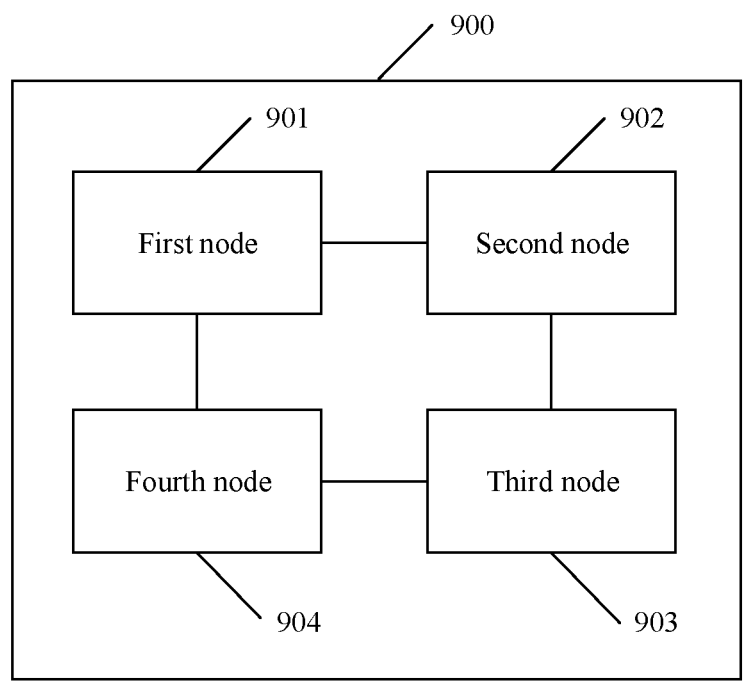
FIG. 9 is a schematic diagram of a structure of a system according to an embodiment of this application.

In another possible application scenario in which the foregoing method embodiments are performed, the method embodiments may be applied to a system 900 shown in FIG. 9. The system 900 may be, for example, the system 200 including four nodes forming a ring link shown in FIG. 2a or FIG. 2b. It may be understood that the system may alternatively be a system 200 that includes at least four nodes in another ring link structure, where the another ring link structure may be a system including 8N or 4N+2 nodes, and the 8N or 4N+2 nodes form a ring link structure, where N≥1, and N is an integer. The four nodes that belong to a 4N- or (4N+2)-node ring link structure and that are included in the system 900 may be evenly or unevenly distributed in a plurality of network devices, or may be all included in one network device. When the four nodes forming the ring link are distributed in a plurality of network devices, the system 900 is a network system formed by the plurality of network devices in which the four nodes are located. When the four nodes forming the ring link are integrated in one network device, the system 900 is a device internal system including the four nodes. Regardless of which specific distribution manner is used, the 4N or 4N+2 nodes on the ring link to which the four nodes belong can be connected to form a ring through links between the nodes, to form a ring network structure. In a specific case, any two adjacent nodes in the 4N or 4N+2 nodes forming the ring are bidirectionally connected. The node may be a basic dicing unit included in a chip, for example, a die, or may be a network device such as a router or a switch.

The system 900 includes a ring link, and a first node 901, a second node 902, a third node 903, and a fourth node 904 arranged in sequence on the ring link. The first node 901, the second node 902, the third node 903, and the fourth node 904 mentioned herein may be nodes that are adjacently arranged in sequence in a clockwise or counterclockwise order, for example, the four nodes shown in FIG. 2a to FIG. 3, or may be nodes that are not adjacently arranged in sequence, that is, the ring link includes 8N or 4N+2 nodes, for example, the cases shown in FIG. 5a and FIG. 5b. For a case of a 4-node ring link, the first node 901, the second node 902, the third node 903, and the fourth node 904 may be, for example, the node 301, the node 302, the node 303, and the node 304 respectively. For a case of an 8N- or (4N+2)-node ring link, the 8-node ring link shown in FIG. 5a is used as an example. The first node 901, the second node 902, the third node 903, and the fourth node 904 may be, for example, the node 501, the node 503, the node 505, and the node 507 respectively, or the node 502, the node 504, the node 506, and the node 508 respectively. The 6-node ring link shown in FIG. 5b is used as an example. The first node 901, the second node 902, the third node 903, and the fourth node 904 may be, for example, the node 512, the node 513, the node 515, and the node 516 respectively. When 8N or 4N+2 nodes are included on the ring link, in addition to the first node 901, the second node 902, the third node 903, and the fourth node 904, other nodes may further be included on the ring link. In this case, the first node 901, the second node 902, the third node 903, and the fourth node 904 are not necessarily adjacently arranged in sequence, but the first node 901, the second node 902, the third node 903, and the fourth node 904 are still arranged on the ring link in a clockwise or counterclockwise order.

The first node 901 is configured to forward, through the second node 902 according to a forwarding policy of the first node 901, all of first traffic that needs to be sent to the third node 903, where two reachable paths with equal hop counts are included from the first node 901 to the third node 903. The second node 902 is configured to forward, through the first node 901 according to a forwarding policy of the second node 902, all of second traffic that needs to be sent to the fourth node 904, where two reachable paths with equal hop counts are included from the fourth node 904 to the second node 902. One transmission path in the two reachable paths that are included from the first node 901 to the third node 903 is specified, to be used by the first node 901 to send the first traffic. This manner of sending traffic on a specified path can implement non-blocking switching of traffic between nodes. In addition, after receiving a plurality of packets included in the first traffic, the third node 903 serving as a destination node does not need to reorder the plurality of packets, reducing a requirement for node resources. Further, when the nodes are basic dicing units integrated into a chip of a network device, an area, power consumption, and a delay of the entire chip can be reduced. In a possible implementation, the third node 903 is configured to forward, through the fourth node 904 according to a forwarding policy of the third node 903, all of third traffic that needs to be sent to the first node 901. The fourth node 904 is configured to forward, through the third node 903 according to a forwarding policy of the fourth node 904, all of fourth traffic that needs to be sent to the second node 902.

In a possible implementation, the forwarding policy of the first node 901 includes presetting that the first node 901 needs to send traffic to the third node 903 through the second node 902, and the forwarding policy of the second node 902 includes presetting that the second node 902 needs to send traffic to the fourth node 904 through the first node 901. The foregoing forwarding policy is set to avoid a problem that used links conflict when the first traffic sent by the first node 901 to the third node 903 and the second traffic sent by the second node 902 to the fourth node 904 are sent in a same period of time, reducing possible network congestion. In addition, the forwarding policy of the third node 903 may include presetting that the third node 903 needs to send traffic to the first node 901 through the fourth node 904, and the forwarding policy of the fourth node 904 may include presetting that the fourth node 904 needs to send traffic to the second node 902 through the third node 903.

In a possible implementation, when 8N or 4N+2 nodes are included on the ring link, the first node 901 sends the first traffic to the second node 902 through a plurality of nodes including the second node 902, where N≥1, and N is an integer.

In a possible implementation, the first traffic includes a packet, and the first node 901 is configured to encapsulate indication information indicating the second node 902 and the third node 903 into the packet, and send the packet to the third node 903.

An embodiment of this application further provides a first node 1000. The first node 1000 may be, for example, the node 301 in the foregoing method embodiments, or any node on a 4N- or (4N+2)-node ring link, for example, any node on the ring link in FIG. 2a to FIG. 7. It can be learned that the first node 1000 belongs to a ring link. The ring link further includes a second node, a third node, and a fourth node, the four nodes are arranged in sequence, and two reachable paths with equal hop counts are included between the first node and the third node. The first node 1000 may perform corresponding methods and functions described in the foregoing method embodiments of this application.

In a specific implementation, the first node 1000 includes a first transceiver 1001 and a second transceiver 1002. The first transceiver 1001 is configured to receive first traffic, where the first node is a source node that sends the first traffic on the ring link. The second transceiver 1002 is configured to send the first traffic to the third node on a preset first transmission path, where the first transmission path passes through the second node, and the first transmission path is one of the two reachable paths with equal hop counts. In a possible implementation, the first node is a network device, for example, a network device that has a packet forwarding function, such as a router or a switch. In another possible implementation, the first node is a basic dicing unit integrated into a chip (for example, a switching chip) of a network device, for example, a die. In this case, one or more of the second node, the third node, and the fourth node may also belong to the network device.

The first transceiver 1001 and the second transceiver 1002 each may include one or more units having a receiving function and a sending function. The first transceiver 1001 is used as an example. The first transceiver may include one or more units that have both a receiving function and a sending function, for example, hardware or software and hardware such as a port, a circuit, or a component. Alternatively, when the first transceiver 1001 includes a plurality of units that have a receiving or sending function, for example, some of the plurality of units may have a receiving function and the other may have a sending function, or some may have a receiving function and a sending function and the other may have a receiving function or a sending function. When the first node 1000 is a basic dicing unit in a chip of a network device, the first transceiver 1001 may be one or more line ports, and the second transceiver may be one or more fabric ports. When the first transceiver 1001 includes a plurality of units having a receiving function, it may be understood that the plurality of units having the receiving function do not necessarily need to be simultaneously enabled. For example, when receiving the first traffic, the first transceiver 1001 may enable only some of the plurality of units having the receiving function. When the first transceiver 1002 includes a plurality of units having a sending function, similarly, the units do not necessarily need to be simultaneously enabled.

In a possible implementation, the second transceiver 1002 is configured to receive second traffic on a second transmission path, where the second transmission path of the second traffic includes the third node and the fourth node, and the third node is a source node of the second traffic on the ring link. When the first node 1000 is a destination node of the second traffic, and the first node 1000 is a basic dicing unit on a chip, the first node 1000 may send, through the first transceiver 1001, the second traffic to a network device to which the first node 1000 belongs.

In a possible implementation, a binding relationship exists between the first node 1000 and the second node, the first transmission path is determined according to a forwarding policy of the first node 1000, and the forwarding policy includes specifying, based on the binding relationship, that the first node 1000 needs to send traffic to the third node through the second node.

In a possible implementation, when 8N or 4N+2 nodes are included on the ring link, the first transmission path passes through a plurality of nodes including the second node, where N≥1, and N is an integer.

In a possible implementation, the first traffic includes a packet, the packet includes indication information used to indicate the first transmission path, and the second transceiver 1002 sends the packet to the third node. The first node 1000 may further include a processing logic circuit. The processing logic circuit is configured to encapsulate the indication information indicating the first transmission path into the packet. The processing logic circuit may be further configured to determine a preset transmission path of the first traffic, and the like.

For other functions that may be performed by the first node 1000, refer to related descriptions of each corresponding node (for example, the node 301) on the ring link in the foregoing method embodiments. Details are not described herein again.

An embodiment of this application further provides a chip system 1100. The chip system 1100 includes a first node 1101, the first node belongs to a 4-node ring link, and the first node 1101, a second node, a third node, and a fourth node are arranged in sequence on the ring link. The first node 1101 may be, for example, the node 301 in the foregoing embodiments, or any node on a 4N- or (4N+2)-node ring link, for example, any node on the ring link in FIG. 2a to FIG. 7. The chip system 1100 may be located in a network device such as a router, a switch, or a switching board.

The first node 1101 sends first traffic to the third node, where two reachable paths with equal hop counts are included from the first node 1101 to the third node, the first node 1101 sends the first traffic to the third node on a preset first transmission path, the first transmission path passes through the second node, and the first transmission path is one of the two reachable paths with equal hop counts. The chip system may be an internal system that is in a network device and that includes one independent chip, or may be an internal system that is in a network device and that includes a plurality of chips. The first node 1101 is configured to receive second traffic on a second transmission path, where the second transmission path of the second traffic includes the third node and the fourth node, and the third node is a source node of the second traffic on the ring link. For other functions that may be performed by the first node 1101 as the source node, refer to related descriptions of a corresponding node (for example, the node 301) in the foregoing method embodiments. Details are not described herein again.

Figure 11:
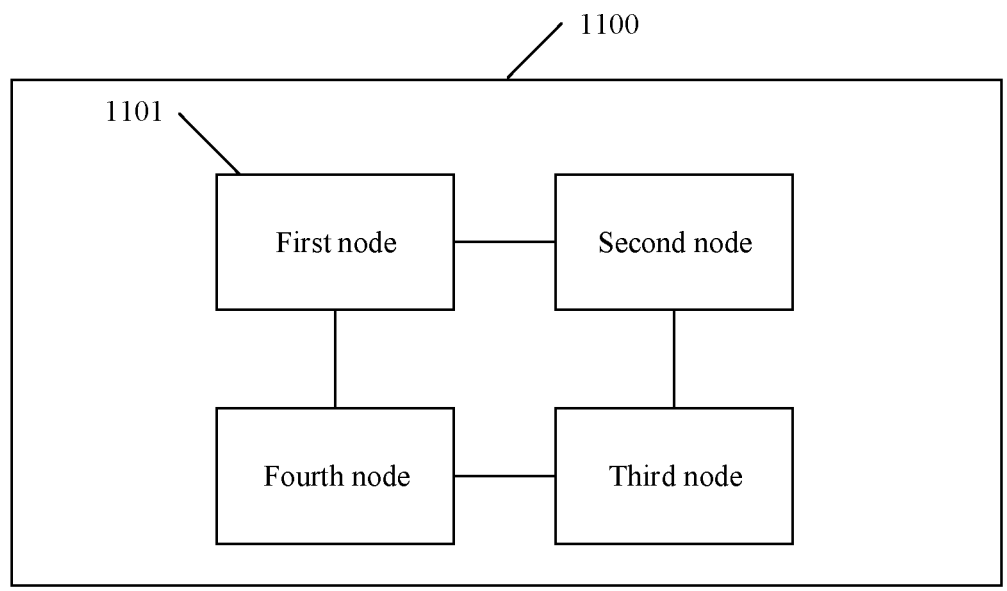
FIG. 11 is a schematic diagram of a structure of a chip according to an embodiment of this application.

In a possible implementation, alternatively, any more of the second node, the third node, and the fourth node may belong to the chip system 1100, or may not belong to the chip system 1100. FIG. 11 shows a case in which all of the four nodes belong to the chip system 1100.

Figure 10:
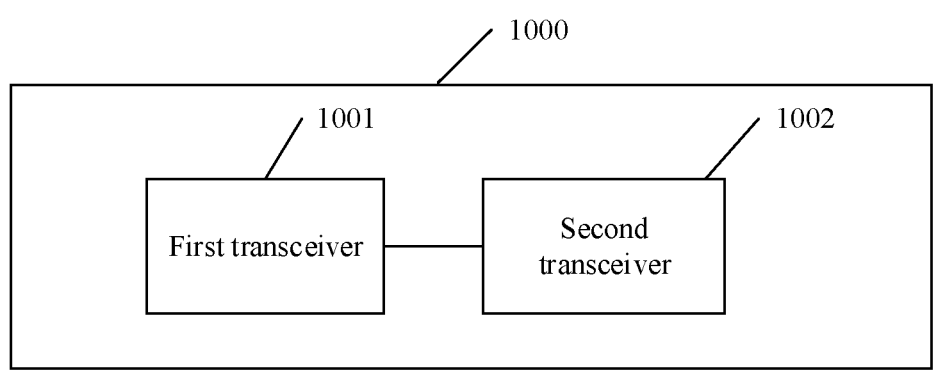
FIG. 10 is a schematic diagram of a structure of a node according to an embodiment of this application.
Figure 12:
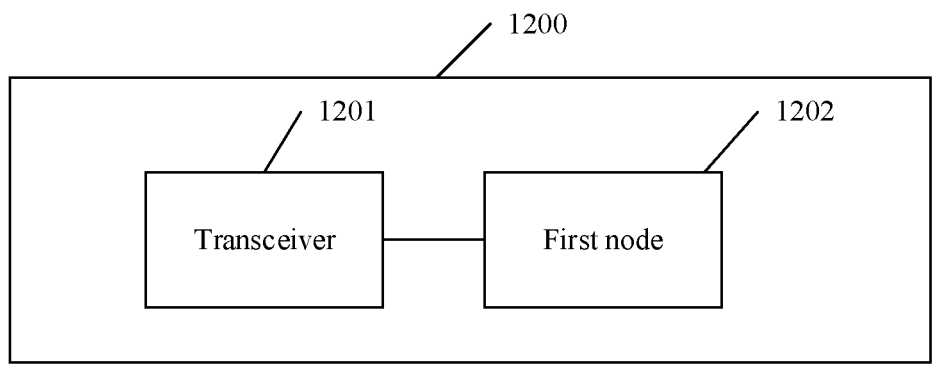
FIG. 12 is a schematic diagram of a structure of a network device according to an embodiment of this application.

An embodiment of this application further provides a network device 1200, as shown in FIG. 12. The network device 1200 includes a transceiver 1201 and a first node 1202. The first node 1202 may be, for example, the node 301 in the foregoing method embodiments, any node on a 4N- or (4N+2)-node ring link, for example, any node on the ring link in FIG. 2a to FIG. 7, or the foregoing first node 1000. The transceiver 1201 in the network device 1200 is configured to receive first traffic, and send the first traffic to the first node 1202. When the first node 1202 is a basic dicing unit on a chip in the network device 1200, the transceiver 1201 may be a transceiver used by the network device 1200 to receive and send traffic from and to an external network device. For example, after receiving the first traffic from an external network device, the transceiver 1201 sends the first traffic to the first node 1202 through a line port of the first node 1202. The line port of the first node 1202 may be, for example, the first transceiver 1001 shown in FIG. 10.

The network device 1200 may perform, at the first node 1202, the methods and functions that may be performed by the corresponding nodes on the ring link described in the foregoing method embodiments. For example, the first traffic is sent by the first node 1002 to the third node through the second node according to a forwarding policy, and two reachable paths with equal hop counts are included from the first node to the third node. The first node 1202 is further configured to receive second traffic on a second transmission path, where the second transmission path of the second traffic includes the third node and the fourth node, and the third node is a source node of the second traffic on the ring link. The first node, the second node, the third node, and the fourth node are arranged in sequence on a ring link. After receiving the second traffic, the first node 1202 may further send the second traffic to the transceiver 1201, so that the transceiver 1201 sends the second traffic to an external network device. For other functions that may be performed by the first node 1202, refer to related descriptions of each corresponding node (for example, the node 301) on the ring link in the foregoing method embodiments. Details are not described herein again.

There may be a plurality of transceivers 1201, to receive different traffic. The different traffic may be distinguished according to a service type, a user, or the like. One or more of the second node, the third node, and the fourth node may be located in the network device 1200, or may be located in another network device in a network.

Figure 13:
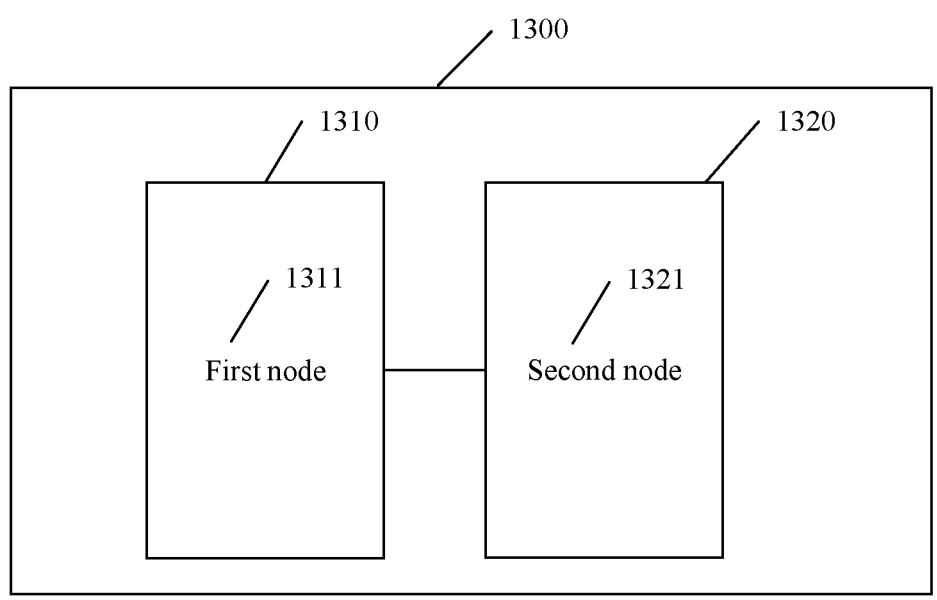
FIG. 13 is a schematic diagram of a structure of a network system according to an embodiment of this application.

FIG. 13 shows a network system 1300 according to an embodiment of this application. The network system 1300 includes at least a first network device 1310 and a second network device 1320.

In a specific implementation, the first network device 1310 includes a first node 1311, and the second network device 1320 includes a second node 1321. The first node 1311, the second node 1321, a third node, and a fourth node belong to a same ring link structure. The first node, the second node, the third node, and the fourth node are arranged in sequence on the ring link, and the ring link may include 4N or 4N+2 nodes in total, where N≥1, and N is an integer. For the third node and the fourth node that belong to the ring link structure, one or both of the third node and the fourth node may be located in the first network device 1310, may be located in the second network device 1320, or may be located in another network device different from the first network device 1310 and the second network device 1320.

The first network device 1310 or the second network device 1320 may be a network switching device, for example, a network device having a packet forwarding function, such as a router or a switch, may be a switching board, or may be a switching chip. The first network device 1310 or the second network device 1320 may be network devices of a same type, for example, switching chips, or may be network devices of different types, for example, a combination of a router and a switching board. The first node, the second node, the third node, and the fourth node each may be a network device, or may be a component having a traffic receiving and sending capability in a network device, for example, a basic dicing unit in a chip of the network device, for example, a die.

When a packet that belongs to a piece of traffic is transmitted in the network system 1300 including the ring link structure, the first network device 1310 may be used as an initial receiving device for the packet flowing into the network system 1300, and may also be referred to as a source network device. The first node 1311 included in the first network device 1310 may be the node 301, the first node 1000, the first node 1101, or the first node 1202 in the foregoing embodiments, or any node on a 4N- or (4N+2)-node ring link, for example, any node on the ring link in FIG. 2a to FIG. 7. For functions that can be performed by the first node and effects achieved by the first node, refer to the foregoing corresponding embodiments. Details are not described herein again.

When the packet is sent from the first network device 1310 and continues to be transmitted in the network system 1300 including the ring link structure, the second network device 1320 may be an intermediate network device receiving the packet. When the second network device 1320 is used as an intermediate device, the second network device 1320 may continue to forward the packet according to indication information in the packet. Alternatively, the second network device 1320 may be a destination network device receiving the packet. When the second network device 1320 is used as an intermediate device, the second node 1321 included in the second network device 1320 is an intermediate node, for example, may be the node 302 in the foregoing embodiments. When the second network device 1320 is used as a destination device, the second node included in the second network device 1320 is a destination node, for example, may be the node 303 in the foregoing embodiments. For functions that can be performed by the second node 1321 and effects achieved by the second node, refer to the foregoing corresponding embodiments. Details are not described herein again.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, and shall not be understood as an indication or implication of relative importance. The term "at least one" means one or more, and the term "a plurality of" means two or more, unless expressly limited otherwise.

Different types of embodiments such as the method embodiments and the apparatus embodiments provided in embodiments of this application may be mutually referred to. This is not limited in embodiments of this application. A sequence of the operations of the method embodiment provided in embodiments of this application can be properly adjusted, and the operations can be correspondingly added or deleted based on a situation. Any method that can be easily figured out by a person skilled in the art without departing from a technical scope disclosed in this application shall fall within the protection scope of this application, and therefore details are not described again.

In the corresponding embodiments provided in this application, it should be understood that the disclosed system and device may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts described as units may or may not be physical units, may be located at one position, or may be distributed on a plurality of network devices (for example, terminal devices). Some or all of the units may be selected based on actual requirements to achieve the objectives of the solutions in embodiments.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A network device comprising a plurality of nodes packaged in one or more switching chips, the number of the plurality of nodes being 4N or 4N+2, N being an integer equal or larger than 1;
    wherein each of the plurality of nodes comprises a network-side port for coupling to an external network device and at least two switch ports for coupling neighbor nodes,
    wherein the plurality of nodes are connected via their switch ports to form a ring link;
    wherein a first node of the plurality of nodes is configured to:
        receive traffic from an external network device via a first network-side port of the first node,
        determine a first transmission path from the first node and a third node on the ring link, and
        send the traffic to the third node through the first transmission path via a second node on the ring link, the first transmission path being one of two reachable paths with equal hop counts from the first node to the third node and comprising the second node.

2. The network device of claim 1, wherein the first node is further configured to
    encapsulate indication information indicating the first transmission path in a packet of the traffic, and
    send the packet with the indication information to the third node.

3. The network device of claim 1, wherein the first node is further configured to
    determine the first transmission path according to a binding relationship between the first node and the second node.

4. The network device of claim 1, wherein the number of the one or more switching chips equals to the number of the plurality of nodes and the plurality of nodes are packaged in their respective switching chips.

5. A system comprising a plurality of nodes, the number of the plurality of nodes being 4N or 4N+2, N being an integer equal or larger than 1,
    wherein the plurality of nodes being arranged to form a ring link, wherein the first node is configured to forward, according to a forwarding policy of the first node, first traffic to a third node of the plurality of nodes through a first transmission path via a second node on the ring link, wherein the first transmission path is one of two reachable paths with equal hop counts from the first node to the third node; and
    wherein the second node is configured to forward, according to a forwarding policy of the second node, second traffic to a fourth node of the plurality of nodes through a second transmission path via a third node on the ring link, wherein the second transmission path is one of two reachable paths with equal hop counts from the second node to the fourth node.

6. The system of claim 5, wherein the forwarding policy of the first node comprises a first preset policy that the first node needs to send traffic to the third node through the second node, and the forwarding policy of the second node comprises a second preset policy that the second node needs to send traffic to the fourth node through the first node.

7. The system of claim 5, wherein the first traffic comprises a packet; and
    the first node is configured to encapsulate indication information indicating the second node and the third node into the packet, and send the packet with the indication information to the third node.

8. The system of claim 5, wherein the first node, the second node, the third node, and the fourth node are packaged in one or more switching chips in a network device.

9. The system of claim 5, wherein the number of the one or more switching chips equals to the number of the plurality of nodes and the plurality of nodes are packaged in their respective switching chips.

10. A method performed by a first node in a ring link, wherein the ring link comprises a plurality of nodes, the number of the plurality of nodes being 4N or 4N+2, N being an integer equal or larger than 1, and the method comprises:
    receiving, by the first node from an external network device out of the ring link, first traffic;
    determining, by the first node, a first transmission path from the first node to a third node on the ring link, wherein the first transmission path is one of two reachable paths on the ring link with equal hop counts from the first node to the third node; and
    sending, by the first node, the first traffic to the third node through the first transmission path via a second node on the ring link.

11. The method of claim 10, wherein the ring link further comprises a fourth node, the first node, the second node, the third node, and the fourth node are arranged in sequence, and the method further comprises:
    receiving, by the first node, second traffic on a second transmission path, wherein the second transmission path of the second traffic comprises the third node and a fourth node on the ring link, and the third node is a source node of the second traffic on the ring link.

12. The method of claim 10, wherein the first node determines the first transmission path according to a binding relationship between the first node and the second node such that the first transmission path passes the second node.

13. The method of claim 10, wherein the first traffic comprises a packet, and the sending, by the first node, the first traffic to the third node on a preset first transmission path comprises:
    encapsulating, by the first node, indication information indicating the first transmission path into the packet, and
    sending the packet with the indication information to the third node.

14. The method according to claim 10, wherein the first node, the second node, and the third node are packaged in one or more switching chips of a network device.

15. The method of claim 14, wherein the number of the one or more switching chips equals to the number of the plurality of nodes and the plurality of nodes are packaged in their respective switching chips.

* * * * *